(12) United States Patent
Yabe et al.

(10) Patent No.: US 7,504,755 B2
(45) Date of Patent: Mar. 17, 2009

(54) ROTOR OF SYNCHRONOUS INDUCTION MOTOR AND COMPRESSOR

(75) Inventors: Koji Yabe, Tokyo (JP); Yoshio Takita, Tokyo (JP); Hayato Yoshino, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 33 days.

(21) Appl. No.: 11/578,940

(22) PCT Filed: Dec. 9, 2005

(86) PCT No.: PCT/JP2005/022687

§ 371 (c)(1),
(2), (4) Date: Oct. 19, 2006

(87) PCT Pub. No.: WO2006/098066

PCT Pub. Date: Sep. 21, 2006

(65) Prior Publication Data

US 2007/0170803 A1    Jul. 26, 2007

(30) Foreign Application Priority Data

Mar. 9, 2005    (JP)    ............................. 2005-065098

(51) Int. Cl.
*H02K 19/10*    (2006.01)
(52) U.S. Cl. ...................... 310/163; 310/211; 310/261
(58) Field of Classification Search ................. 310/162, 310/163, 261, 211, 216
See application file for complete search history.

(56) References Cited

U.S. PATENT DOCUMENTS 3,758,800 A * 9/1973 McLaughlin ................ 310/211

(Continued)

FOREIGN PATENT DOCUMENTS

JP    2000-166198    6/2000

(Continued)

OTHER PUBLICATIONS

Machine Translation of fujimura et al. (JP 2005006416), "Synchronous Induction Motor, Manufacturing Method, and Compressor", May 23, 2003.*

(Continued)

*Primary Examiner*—Karl I Tamai
(74) *Attorney, Agent, or Firm*—Buchanan Ingersoll & Rooney PC

(57) ABSTRACT

It is an object to obtain a highly efficient synchronous induction motor by letting the magnetic flux hardly pass in the direction of a q axis without interrupting a magnetic path in the direction of a d axis and by increasing a salient pole difference. A slit next to a shaft 5 is extended towards the shaft along a circumference of the shaft 5 to form an extended part of slit 8a. In addition, a gas vent hole 7 is formed as a slender opening stretched in the direction of d axis, and a slit is projected along the circumference of the gas vent hole 7. Further, the gas vent hole 7 is formed as a slender opening stretched in the direction which is displaced by a predetermined angle from the d axis. Yet further, a rotor iron core 1 is formed by a plurality of rotor iron core portions in the laminating direction, and the rotor iron core portions have different shapes of slits, respectively.

7 Claims, 21 Drawing Sheets

U.S. PATENT DOCUMENTS

| | | | |
|---|---|---|---|
| 3,862,446 A * | 1/1975 | Hilgeman et al. | 310/163 |
| 5,831,367 A * | 11/1998 | Fei et al. | 310/217 |
| 6,858,968 B2 | 2/2005 | Takita et al. | |
| 6,906,448 B2 | 6/2005 | Yoshino et al. | |
| 7,102,259 B2 | 9/2006 | Kawaguchi et al. | |
| 2003/0111927 A1* | 6/2003 | Takita et al. | 310/216 |
| 2003/0173861 A1* | 9/2003 | Kawaguchi et al. | 310/261 |
| 2007/0170803 A1* | 7/2007 | Yabe et al. | 310/162 |

FOREIGN PATENT DOCUMENTS

| | | |
|---|---|---|
| JP | 2003-153511 | 5/2003 |
| JP | 2003-153512 | 5/2003 |
| JP | 2003-189568 | 7/2003 |
| JP | 2005-6416 | 1/2005 |
| JP | 2005-006416 | 1/2005 |

OTHER PUBLICATIONS

Korean Office Action, with English-language Translation, dated Nov. 20, 2007.

* cited by examiner

ROTOR OF SYNCHRONOUS INDUCTION MOTOR AND COMPRESSOR

BACKGROUND

1. Field of the Invention

The present invention relates to a rotor of a synchronous induction motor which starts using induction torque and carries out synchronous operation using reluctance torque and a compressor employing the synchronous induction motor.

2. Description of Related Art

In a conventional synchronous induction motor, plural slits and slots are provided on a rotor iron core formed by electromagnetic steel sheets, and in order to let the magnetic flux easily flow in a direction of a d axis, a gas vent hole is formed into an oval shape that is stretched in the direction of d axis, so that efficiency of the synchronous induction motor is tried to be improved (refer to Patent Document 1, for example).

Patent Document 1: JP2003-153511 (page 5, FIG. 6)

In a rotor of a conventional synchronous induction motor, a gas vent hole has an oval shape having a short axis in a direction of a q axis and a long axis in the direction of a d axis, so that widths of electromagnetic steel sheets at both sides of the gas vent hole can be made thick, a width of a magnetic path in the direction of d axis is secured, and the magnetic flux can easily pass in the direction of d axis. However, in this structure, the magnetic flux can easily flow also in the direction of q axis, which causes a problem that a large salient pole difference cannot be obtained.

BRIEF SUMMARY

The present invention is provided to solve the above problem and aims to compose a rotor having a large salient pole difference between the d axis and the q axis by letting magnetic flux easily pass in the direction of d axis and hardly flow in the direction of q axis so as to obtain a highly efficient synchronous induction motor.

According to the present invention, a rotor of a synchronous induction motor includes: a rotor iron core formed by laminating a plurality of electromagnetic steel sheets; at least one pair of slits provided at each of the plurality of electromagnetic steel sheets to form a magnetic pole projection so as to obtain a d axis that is a direction in which magnetic flux easily flows and a q axis that is a direction in which magnetic flux hardly flows; a plurality of slots connected to the slits and provided adjacent to an outer circumference of the electromagnetic steel sheets to generate an induction torque; conductive material filled in at least the slots among the slits and the slots; and a shaft which is an axis of rotation provided at a center part of the rotor iron core, and a slit next to the shaft has a shape, a side of the shaft of which is projected along a circumference of the shaft.

Further, the rotor of synchronous induction motor also includes a gas vent hole having a slender opening stretched in a direction of the d axis on the d axis, and a slit next to the gas vent hole has a shape, a side of the gas vent hole of which is projected along a circumference in a longitudinal direction of the gas vent hole.

Further, distances between the gas vent hole and slits next to the gas vent hole are set to $L \leq A+B$, where a width of the electromagnetic steel sheets at an outer circumferential edge on the d axis is L, a distance between a slit next to one side of the gas vent hole and the gas vent hole is A, and a distance between a slit next to other side of the gas vent hole and the gas vent hole is B.

Further, the shaft is formed to have a cross section vertical to the axis of rotation, in which a length in a direction of the q axis is shorter than a length of a direction of the d axis, and a slit next to the shaft has a shape, a side of the shaft of which is projected toward the shaft along the circumference of the shaft.

Further, the rotor iron core is formed by laminating grain oriented electromagnetic steel sheets as the electromagnetic steel sheets, and the grain oriented electromagnetic steel sheets are formed so that easily magnetizable direction should be roughly parallel to the d axis.

Further, according to the invention, a compressor includes the above rotor of synchronous induction motor.

Further, according to the invention, a rotor of a synchronous induction motor includes: a rotor iron core formed by laminating a plurality of electromagnetic steel sheets; at least one pair of slits is provided at each of the plurality of electromagnetic steel sheets to form a magnetic pole projection so as to obtain a d axis that is a direction in which magnetic flux easily flows and a q axis that is a direction in which magnetic flux hardly flows; a plurality of slots connected to the slits and provided adjacent to an outer circumference of the electromagnetic steel sheets to generate an induction torque; conductive material filled in at least the slots among the slits and the slots; a shaft which is an axis of rotation provided at a center part of the rotor iron core; and a gas vent hole provided on the d axis and having a slender opening stretched in a direction which is displaced by a predetermined angle from the d axis.

Further, distances between the gas vent hole and slits next to the gas vent hole are set to $L \leq = A+B$ where a width of the electromagnetic steel sheets at an outer circumferential edge on the d axis is L, a distance between a slit next to one side of the gas vent hole and the gas vent hole is A, and a distance between a slit next to other side of the gas vent hole and the gas vent hole is B.

Further, the shaft is formed to have a cross section vertical to the axis of rotation, in which a length in direction of the q axis is shorter than a length of direction of the d axis, and a slit next to the shaft has a shape, a side of the shaft of which is projected toward the shaft along the circumference of the shaft.

Further, the rotor iron core is formed by laminating grain oriented electromagnetic steel sheets as the electromagnetic steel sheets, and the grain oriented electromagnetic steel sheets are formed so that easily magnetizable direction should be roughly parallel to the d axis.

According to the invention, a compressor includes the above rotor of synchronous induction motor.

According to the present invention, the rotor of a synchronous induction motor includes: a rotor iron core formed by laminating a plurality of electromagnetic steel sheets; at least one pair of slits provided at each of the plurality of electromagnetic steel sheets to form a magnetic pole projection so as to obtain a d axis that is a direction in which magnetic flux easily flows and a q axis that is a direction in which magnetic flux hardly flows; a plurality of slots connected to the slits and provided adjacent to an outer circumference of the electromagnetic steel sheets to generate an induction torque; conductive material filled in at least the slots among the slits and the slots; and a shaft which is an axis of rotation provided at a center part of the rotor iron core, and the rotor iron core is formed by a plurality of rotor iron core portions in a laminating direction, and the slits have different shapes for each of the rotor iron core portions.

Further, electromagnetic steel sheets of a rotor iron core portion located at an end in the laminating direction have a gap around the shaft.

Further, the rotor iron core is formed so that at a portion in which electromagnetic steel sheets having different shapes of slits are located next to each other, at least a part of slits and slots of one side and at least a part of slits and slots of other side should be communicable in the laminating direction.

Further, the rotor iron core has a gas vent hole on the d axis, and the gas vent hole is displaced with keeping communicable state in the laminating direction.

Further, according to the present invention, a compressor includes the above rotor of synchronous induction motor.

Further, according to the present invention, a rotor of a synchronous induction motor includes: a rotor iron core formed by laminating a plurality of electromagnetic steel sheets; at least one pair of slits provided at each of the plurality of electromagnetic steel sheets to form a magnetic pole projection so as to obtain a d axis that is a direction in which magnetic flux easily flows and a q axis that is a direction in which magnetic flux hardly flows; a plurality of slots connected to the slits and provided adjacent to an outer circumference of the electromagnetic steel sheets to generate an induction torque; conductive material filled in at least the slots among the slits and the slots; and a shaft which is an axis of rotation provided at a center part of the rotor iron core, and a width of the electromagnetic steel sheets at an outer circumferential edge that form a magnetic path on the d axis is a predetermined width that does not generate magnetic saturation, and a nonmagnetic portion is provided so that a width of the magnetic path on the d axis except for a proximity of the shaft should be equal to or greater than the predetermined width.

Further, according to the present invention, a compressor includes the above rotor of synchronous induction motor.

EXPLANATION OF SIGNS

1: a rotor; 2: a slit; 3: a slot; 4: a strip, 4a: a strip on d axis; 5: a shaft; 7: a gas vent hole; 8a: an extended part of slit; 8b: an extended part of slit; 8c: an extended part of slit; 9: a deformed shaft; 10: a grain oriented electromagnetic steel sheet; 11: an easily magnetizable direction; 12: an entering direction of magnetic flux; 13: an upper rotor iron core; 14: a lower rotor iron core; 15: a center part of a rotor; 16: an upper slit; 17: a lower slit; 18: an upper slot; 19: a lower slot; 23: a thin-walled portion; 24: a nonmagnetic portion; 30: an end ring; 31: a mechanism; and 32: a mold for end ring.

DETAILED DESCRIPTION

In the present invention, by providing slits which are nonmagnetic substance in parallel on electromagnetic steel sheets, magnetic pole projections are formed in the direction of d axis that is a direction in which the magnetic flux easily passes and in the direction of q axis that is a direction in which the magnetic flux hardly passes. Here, in this invention, by forming a nonmagnetic portion or making a slit projected at a magnetic path on a wide d axis, the magnetic flux of the q axis is made to hardly pass without interrupting the magnetic path of the d axis, which enables to increase the salient pole difference. Therefore, according to the present invention, it is possible to obtain a rotor of a highly efficient synchronous induction motor.

Embodiment 1

Figure 1:
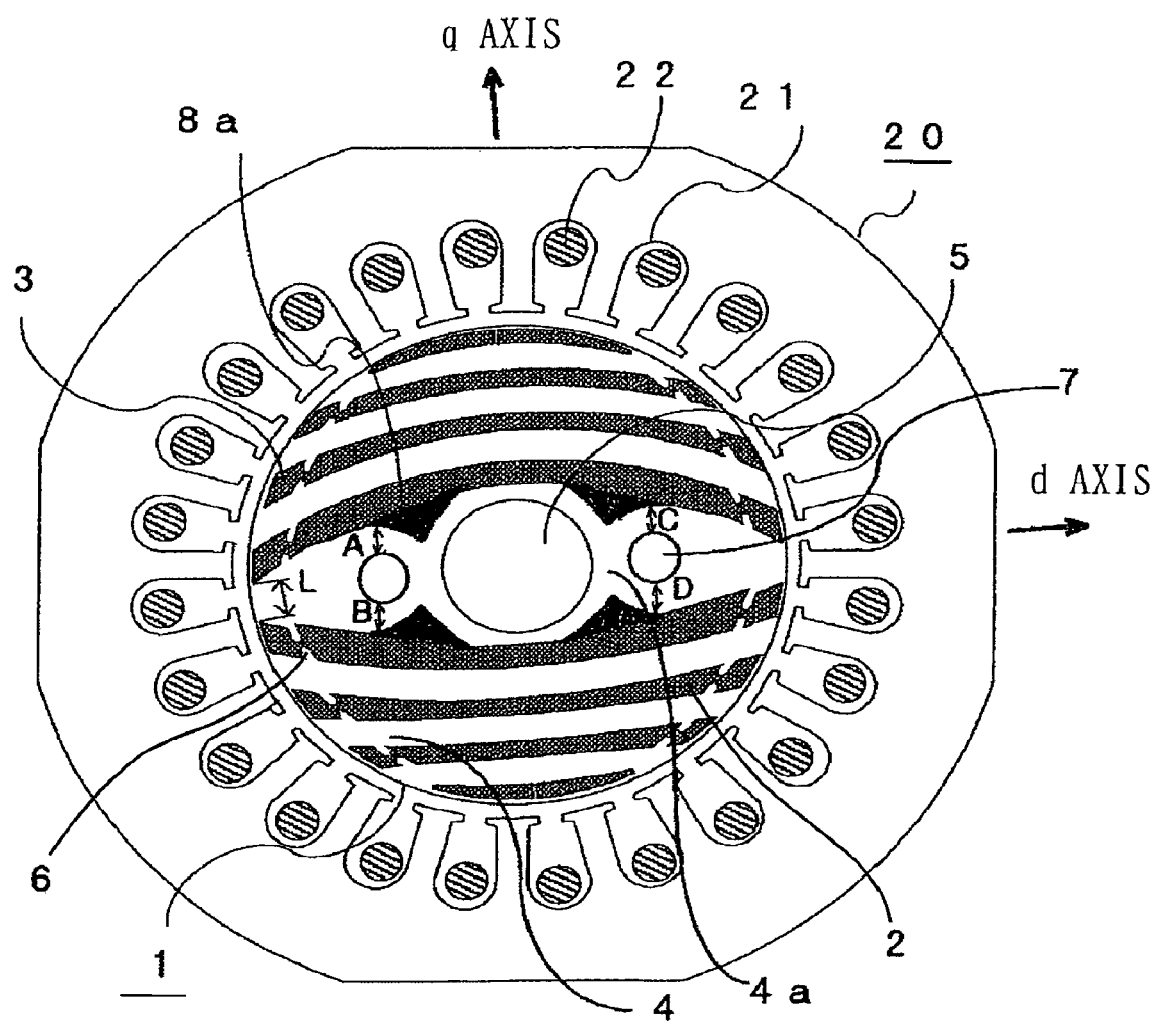
FIG. 1 is a cross sectional structural view of a synchronous induction motor according to the first embodiment.

Hereinafter, the first embodiment of the present invention will be explained by referring to the figures. FIG. 1 shows a synchronous induction motor according to the first embodiment and is a cross sectional structural view along a plane vertical to an axis of rotation. A stator 20 is placed around a rotor 1 with a predetermined gap. The stator 20 is formed by a plurality of electromagnetic steel sheets being magnetic substance, including a plurality of stator slots 21, in which windings 22 are contained. The rotor 1 is formed by a plurality of laminated electromagnetic steel sheets being magnetic substance. In slits 2 and slots 3, nonmagnetic and conductive material such as aluminum, for example, is filled by die casting. A portion of the electromagnetic steel sheet between neighboring slits 2 forms a strip 4, and a thin walled portion formed outside the rotor is 0.1 mm through some millimeters thick. The slits 2, at least one pair of which are provided at the electromagnetic steel sheets, form magnetic pole projections so as to obtain a d axis that is a direction in which the magnetic flux easily flows and a q axis that is a direction in which the magnetic flux hardly flows. Further, the slots 3, a plurality of which is connected to the slits 2 and provided adjacent to an outer circumference of the electromagnetic steel sheets, generate induction torque. If aluminum which is conductive material filled by die casting is filled at least in the slots 3 among the slits 2 and the slots 3, it is possible to generate induction torque by the slots 3 and also to form magnetic pole projections of the d axis and the q axis by the slits 2.

A shaft 5 which is an axis of rotation is fixed to a center part of the rotor 1 by press fit or shrink fit so as to penetrate the center part. A rib 6 is for separating the slits 2 and the slots 3. By providing the rib 6, startability of the synchronous induction motor is improved since secondary current is efficiently induced at the time of starting. A gas vent hole 7 is an air hole that is necessary depending on an apparatus mounting a synchronous induction motor. For example, in a compressor, such as refrigerant or oil circulates through the gas vent hole 7. The gas vent hole 7 is sometimes used for passing wind for cooling or adjusting locations in case of being mounted on a fan, etc. Further, the gas vent hole 7 is sometimes unnecessary. An extended part of slit 8a is an extended part formed by making a slot next to the shaft 5 projected at a side of the shaft 5 along a circumference of the shaft 5.

Figure 2:
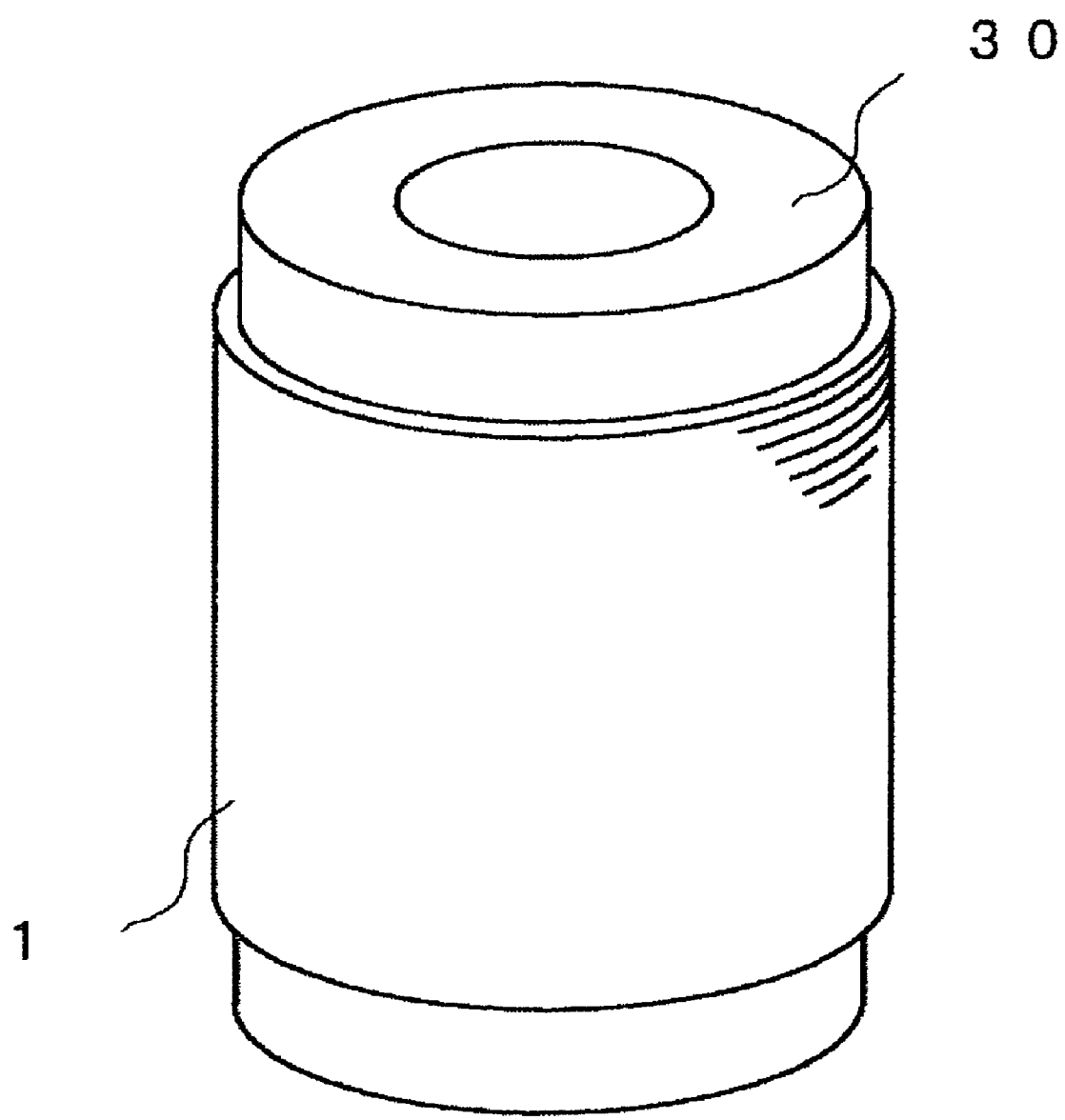
FIG. 2 is a slanted view showing a rotor of the synchronous induction motor according to the first embodiment.

FIG. 2 is a slanted view showing the rotor of synchronous induction motor. The rotor 1 of the synchronous induction motor has a structure in which aluminum filled in the slits 2 and the slots 3 provided at the laminated electromagnetic steel sheets are connected with the end ring 30, which is a similar structure to an induction motor.

Hereinafter, an operation of the synchronous induction motor will be explained.

Upon starting, the synchronous induction motor generates rotating magnetic field by a single-phase or three-phase winding wound as a stator winding. Then, in the synchronous induction motor, by providing the rotating magnetic field at the rotor 1, secondary current is induced to the slots 3, and induction torque is generated by a principle similar to a squirrel-cage induction motor. Further, since the aluminum is filled in the slits 2 of the rotor 1, a nonmagnetic portion is formed. Because of this, the rotor 1 is provided with a d axis that is a direction in which the magnetic flux easily flows and a q axis that is a direction in which the magnetic flux hardly flows. Therefore, a difference is created between an inductance Ld of the d axis and an inductance Lq of the q axis, and thus the rotor is provided with saliency. Since reluctance torque is generated by this saliency, when the speed is approaching a synchronous rate, the rotor 1 is pulled by the synchronous rate, and synchronous operation is carried out using the reluctance torque.

By the above principle, since no specific starting system is necessary to operate the synchronous induction motor, it is possible to form a low-cost synchronous induction motor. Further, since the synchronous induction motor operates at the synchronous rate at the time of steady operation, secondary copper loss is reduced, and the motor is highly efficient. In particular, the synchronous induction motor operates using the reluctance torque at the time of steady operation, so that it is possible to obtain a highly efficient synchronous induction motor by increasing a salient pole difference.

If the width of a slit 2 is large, the salient pole difference becomes large, the current-torque characteristics improve, and the copper loss can be reduced. On the other hand, when the width of a slit 2 is too large, a strip 4 becomes narrow to generate magnetic saturation, which degrades the current-torque characteristics on the contrary. Accordingly, a slit 2 should be extended, with maintaining the width of a strip 4 to a size that does not generate magnetic saturation. In the structure shown in FIG. 1, among plural strips 4, the magnetic flux density is low at a portion of strip 4a on the d axis where the shaft is located. Gas vent holes 7 are provided at both sides of the shaft 5 as shown in FIG. 1, and the gas vent holes 7 are usually round. The gas vent holes 7 are spaces and can be considered as nonmagnetic portions. The shaft 5 has much larger area than an area of the gas vent holes 7, and this portion is considered as a magnetic portion. In this embodiment, the slits 2 located next to the shaft 5 have shapes that follow the circumference of the shaft 5 at the shaft sides. In FIG. 1, plural slits are provided in parallel, among which a slit 2 located next to the shaft 5, namely, the innermost slit 2 has a shape at the shaft side that is projected along the circumference of the shaft 5 to form an extended part of slit 8a, which extends the width of the slit located next to the shaft 5.

By providing the extended part of slit 8a, the magnetic flux is made to hardly pass in the direction of q axis. On the other hand, in the direction of d axis, the magnetic flux quantity is determined by the width of electromagnetic steel sheets at an outer circumferential edge. Therefore, even if the magnetic path adjacent to the gas vent hole 7 is narrowed to some extent, the magnetic saturation can hardly occur unless the magnetic path becomes no more than the width of outer circumferential edge of electromagnetic steel sheets. Moreover, since the shaft 5 is a magnetic portion, the magnetic path on the d axis includes the shaft 5. Accordingly, even if the width of the slit 2 is extended along the circumference of the shaft 5, the passability of magnetic flux in the direction of d axis can be maintained, and the unpassability of magnetic flux in the direction of q axis can be increased. Because of this, by providing the extended part of slit 8a, the salient pole difference can be increased, which enables to form a rotor of a highly efficient synchronous induction motor.

As discussed above, even if the extended part of slit 8a is provided along the circumference of the shaft 5, the magnetic flux flows through the shaft, so that the magnetic path can be sufficiently secured at this portion. However, because the gas vent holes 7 are provided at both sides of the shaft 5 in the strip 4a on the d axis, the shape of the extended part of slit 8a essentially follows a part of the circumference of the gas vent holes 7. Since the gas vent holes 7 are spaces and do not form magnetic paths, the electromagnetic steel sheets should remain partially on the circumference of the gas vent holes 7 so as to form magnetic paths to some extent.

For example, as shown in FIG. 1, a predetermined width L is maintained as an outer circumference size of the rotor on the d axis, which is a narrow distance that does not generate the magnetic saturation while the synchronous induction motor operates. In this case, if a distance between the gas vent hole 7 and the extended part of slit 8*a* becomes less than the predetermined width L of the electromagnetic steel sheets at the outer circumferential edge on the d axis, the magnetic saturation occurs, and the characteristics deteriorates. Accordingly, the relationship with the predetermined width L, the distances between the extended part of slits 8*a* and the gas vent holes 7, that is, A, B, C, and D should be set as L≦A+B, L≦C+D. When the extended part of slit 8*a* is formed at maximum so as to let the magnetic flux hardly pass in the direction of q axis, if A+B and C+D are almost the same as L or a little greater than L, the magnetic saturation cannot occur at the strip 4*a* on the d axis. Namely, when the extended part of slit 8*a* is projected along the circumference of the shaft 5 and the gas vent hole 7, if the above relationship can be maintained, the generation of the magnetic saturation can be prevented around the gas vent hole 7, which prevents the characteristics from deteriorating.

Here, in order to set a width L of the electromagnetic steel sheets at an outer circumferential edge on the d axis to a narrow distance that does not generate the magnetic saturation, the predetermined width can be previously obtained by simulation or driving a test model.

In the present embodiment, by providing slits which are nonmagnetic substance in parallel at the electromagnetic steel sheets, magnetic pole projections are formed in the direction of d axis that is a direction in which the magnetic flux easily passes and in the direction of q axis that is a direction in which the magnetic flux hardly passes. Here, in this embodiment, because of necessity to provide a shaft which becomes an axis of rotation, a pair of slits are formed at both sides of the shaft, and the d axis which is a wide magnetic path is formed at the shaft. By narrowing the magnetic path of this shaft to a range that does not generate magnetic saturation as much as possible, the slits can be efficiently extended in the direction of the q axis, which makes the magnetic flux of the q axis hardly pass without interrupting the magnetic path of the d axis. Consequently, it is possible to increase the salient pole difference and to obtain a rotor of a highly efficient synchronous induction motor.

In addition, as shown in FIG. 2, end rings are provided at the top and bottom in the laminating direction so as to generate induction torque as well as the slots at the time of starting and also to firmly maintain the laminated electromagnetic steel sheets in upward and downward direction. Because of this, even if the width of the slit is increased by providing the extended part of slit 8*a*, the structure is sufficiently strong against the centrifugal force of the rotation.

Figure 3:
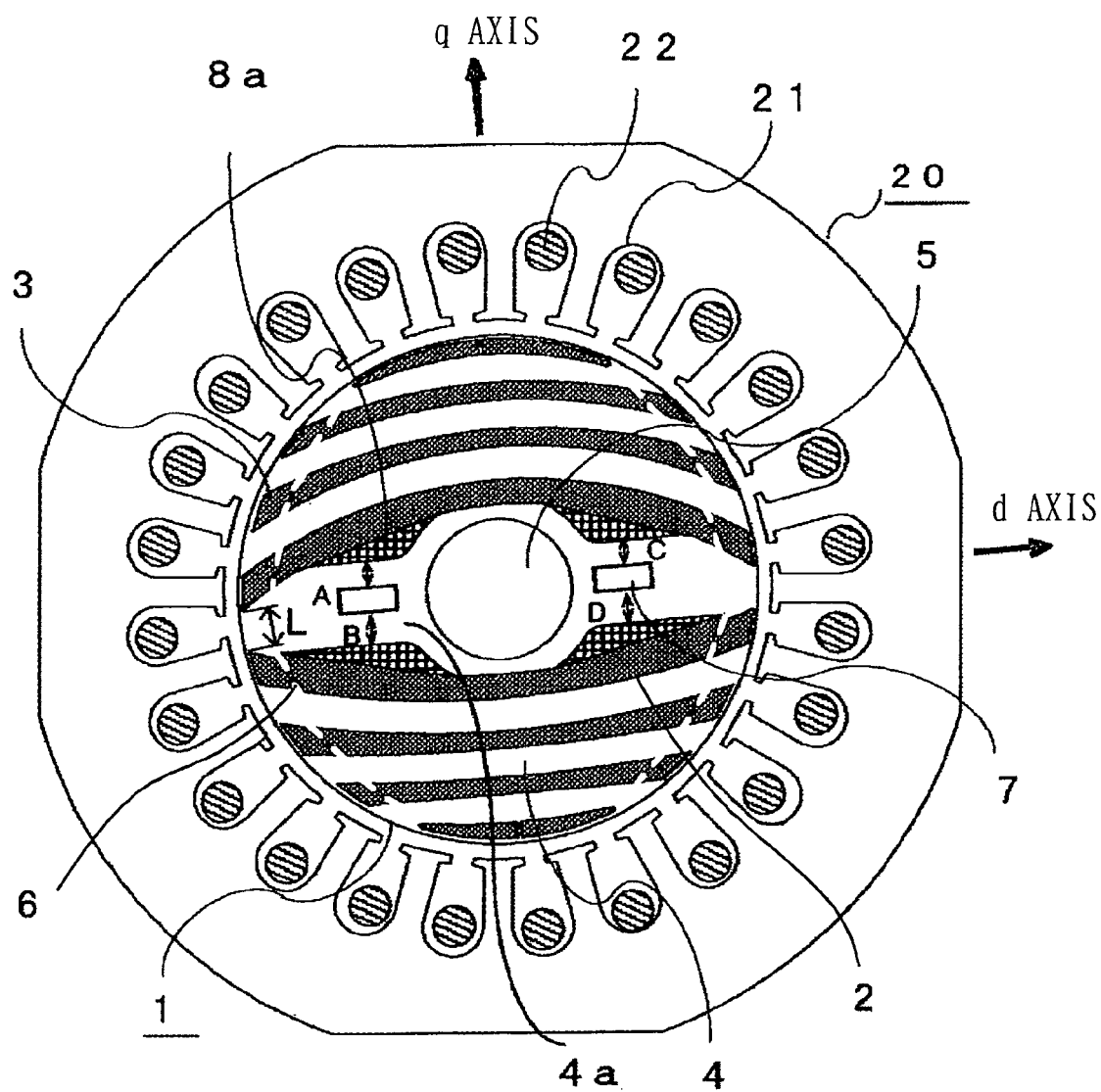
FIG. 3 is a cross sectional structural view showing another structure of the synchronous induction motor according to the first embodiment.

FIG. 3 is a cross sectional structural view of another structure example of the synchronous induction motor according to the embodiment. In the rotor of this structure, a gas vent hole 7 has a shape deformed from a circular hole. The gas vent hole 7 is provided by reason of equipment that mounts the synchronous induction motor, but there is no special restriction on its shape, etc. It is sufficient for the gas vent hole 7 to have a structure in which a certain quantity of gas flows, and here, the gas vent hole has a shape that is stretched in the direction of the d axis, that is, for example, a rectangular shape.

In FIG. 3, the gas vent hole has a shape of slender open hole, and the gas vent hole is placed so that its longitudinal direction should be roughly parallel to the d axis. When the gas vent hole 7 is made slender, it is possible to extend the extended part of slit 8*a* so as to follow the circumference of the slender gas vent hole, which makes an area of the extended part of slit 8*a* larger than a case in which the gas vent hole is circular. Because of this, when the gas vent hole 7 is made slender, the salient pole difference between the direction of q axis and the direction of d axis can be increased. Further, in this case, the magnetic flux easily flows in the direction of d axis than a case of a circular shape, and even if the extended part of slit 8*a* is provided, sufficient portion of the electromagnetic steel sheets can be secured around the gas vent hole 7. Therefore, the magnetic saturation hardly occurs, so that a rotor of a highly efficient synchronous induction motor can be formed.

As shown in FIG. 3, the gas vent hole 7 is made rectangular, and by placing the rectangle so that its longitudinal direction should be parallel to the d axis, the slit can be extended the most efficiently. However, as well as the structure shown in FIG. 1, when an outer circumference size L of the rotor on the d axis is maintained to a narrow distance that does not generate the magnetic saturation while the synchronous induction motor operates, if the distance between the gas vent hole 7 and the extended part of slit 8*a* is smaller than the distance L between the slits, the magnetic saturation occurs and the characteristics deteriorate. Therefore, it is possible to prevent the magnetic saturation by setting the relationship among A, B, C, and D which are distances between the extended part of slit 8*a* and the gas vent hole 7 to L≦A+B, L≦C+D.

Further, if each angle of the rectangular gas vent hole 7 is made round or ellipse to smoothen the flow of magnetic flux, it becomes easier to extend the slit, and moreover the magnetic flux flows more easily, so that a highly efficient synchronous induction motor can be obtained. Here, a shape of the gas vent hole 7 is not limited to a circle or a rectangle, but can be formed in another shape such as an oval, a lozenge, a parallelogram, etc.

Figure 4:
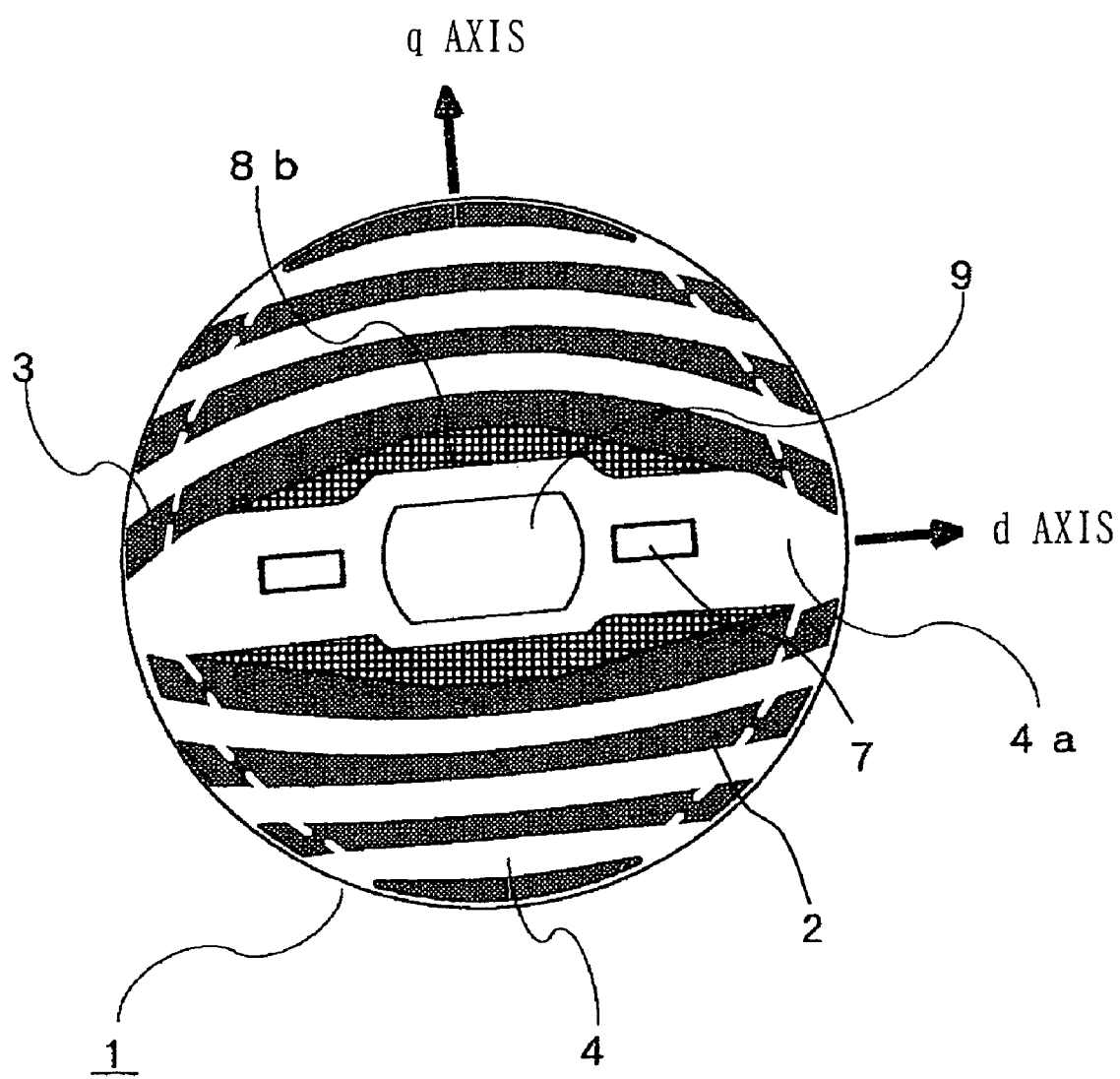
FIG. 4 is a cross sectional structural view showing another rotor of the synchronous induction motor according to the first embodiment.

Further, FIG. 4 is a cross sectional structural view showing another structural example of a rotor of the synchronous induction motor according to this embodiment. Illustration of FIG. 4 omits the stator. With respect to the stator, the structure is the same as ones shown in FIGS. 1 and 3. In the structure of FIG. 4, a deformed shaft 9 has a shape which is formed by cutting a round shaft 5 in roughly parallel to the d axis. And in the structure of FIG. 4, a shape of a slit 2 next to the deformed shaft 9 is extended along the circumference of the deformed shaft 9 to form an extended part of slit 8*b*, which increases the width of the slit in the direction of q axis.

When magnetic substance is used for the deformed shaft 9, the deformed shaft can be used as the magnetic path, and a strip 4*a* on the d axis has a sufficiently wide magnetic path compared with other strips, and the magnetic flux density is low. Accordingly, if the slit 2 is extended and the width of the strip 4*a* on the d axis is decreased, there is little possibility that the magnetic saturation occurs, and the salient pole difference can be increased. However, a distance between the shaft 5 and the slit 2 needs to have a size enough to maintain the mechanical strength against the centrifugal force at the time of rotation, and when the shaft 5 is round, the slit cannot be extended. In the structure of FIG. 4, the round shaft 5 is cut in roughly parallel to the d axis, and the length of the shaft 5 in the direction of q axis is made shorter than the length of the direction of d axis, so that it is possible to provide an extended part of slit 8*b* at a part shortened in the direction of q axis. By providing the extended part of slit 8*b*, the salient pole difference can be increased with maintaining the mechanical strength, which enables to obtain a more highly efficient induction motor.

Further, the same effect can be obtained by deforming the whole part of the deformed shaft 9 in the laminating direction of the electromagnetic steel sheets and also by deforming only a part of the deformed shaft to be inserted into the rotor 1. Further, since both ends of the deformed shaft 9 are not completely circular, it is preferable to use a mechanism that supports only one side rather than a form that fixes both sides of the shaft by bearings. Further, even if supported at both sides, the deformed shaft 9 can obtain the same effect by adjusting the supporting manner to the shape of the deformed shaft.

In another way, it is also effective to make only a diameter of the part of the shaft to be inserted into the rotor smaller than a diameter of a part that is not inserted into the rotor. The width of the slit in the direction of q axis can be extended with a reduced amount of the diameter of the shaft. In this case, the part of the shaft that is not inserted into the rotor is made round, and the shaft should be inserted from upward/downward of the rotor in the laminating direction at the time of manufacturing. It is possible to obtain a highly efficient synchronous induction motor which can be used with the mechanism that supports the existing round shaft at both sides and further the width of the slit can be extended in the direction of q axis within the electromagnetic steel sheets.

Moreover, this deformed shaft 9 can be used as a shaft shown in FIG. 1. In this case, since the extended part of slit can have a larger area than the extended part of slit of FIG. 1, the salient pole difference can be further increased, which enables to compose a highly efficient synchronous induction motor.

Figure 5:
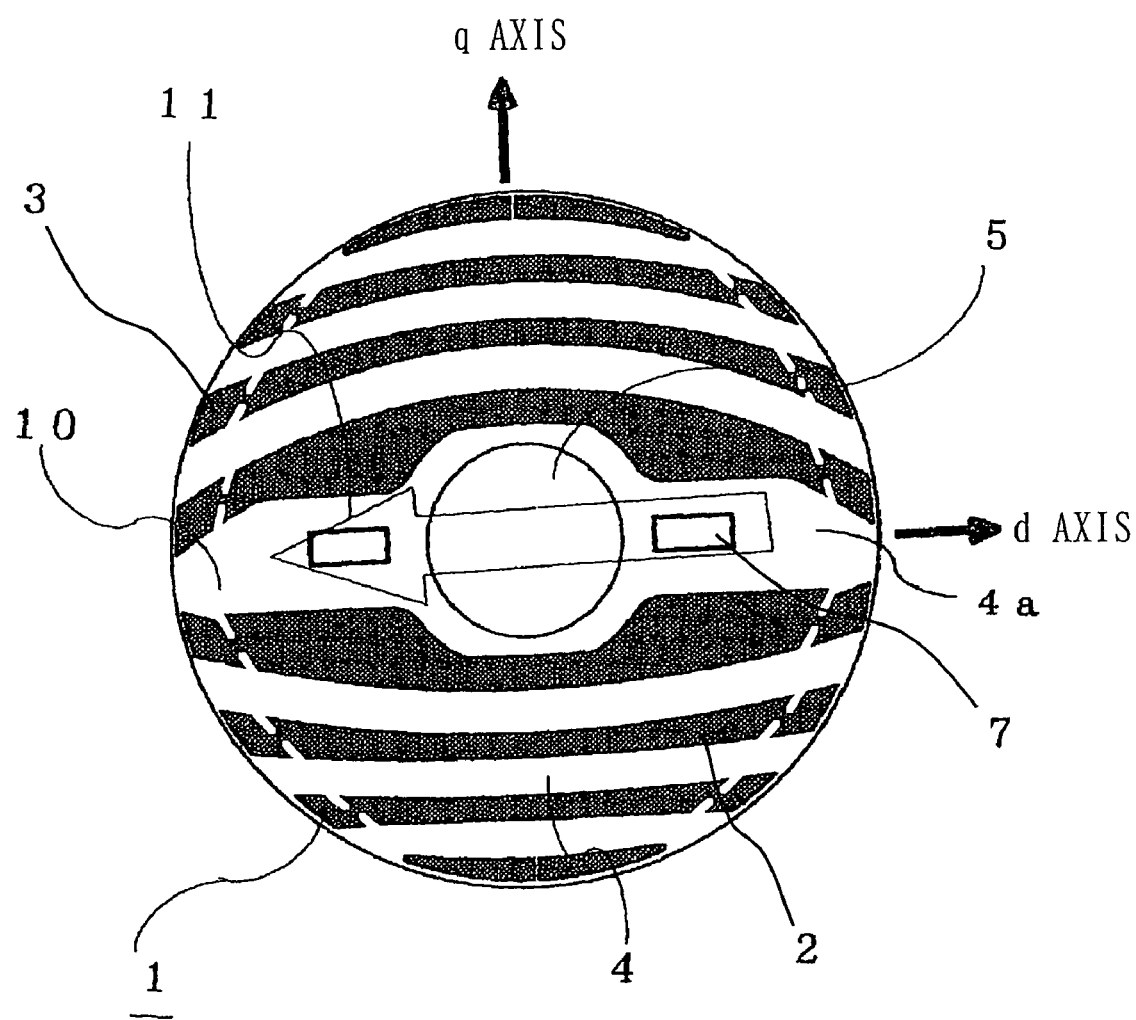
FIG. 5 is a cross sectional structural view showing another rotor of the synchronous induction motor according to the first embodiment.

A rotor 1 of the synchronous induction motor having a structure shown in FIG. 5 uses grain oriented electromagnetic steel sheets 10 having an easily magnetizable direction in which the magnetic flux easily passes and a direction in which the magnetic flux hardly passes. By placing an easily magnetizable direction 11 shown by a white arrow in roughly parallel to the d axis, it is possible to obtain a rotor in which the magnetic flux easily passes in the direction of d axis. Namely, a highly efficient synchronous induction motor can be obtained, since the salient pole difference is increased compared with a case of using non-directional laminated electromagnetic steel sheets.

Figure 6:
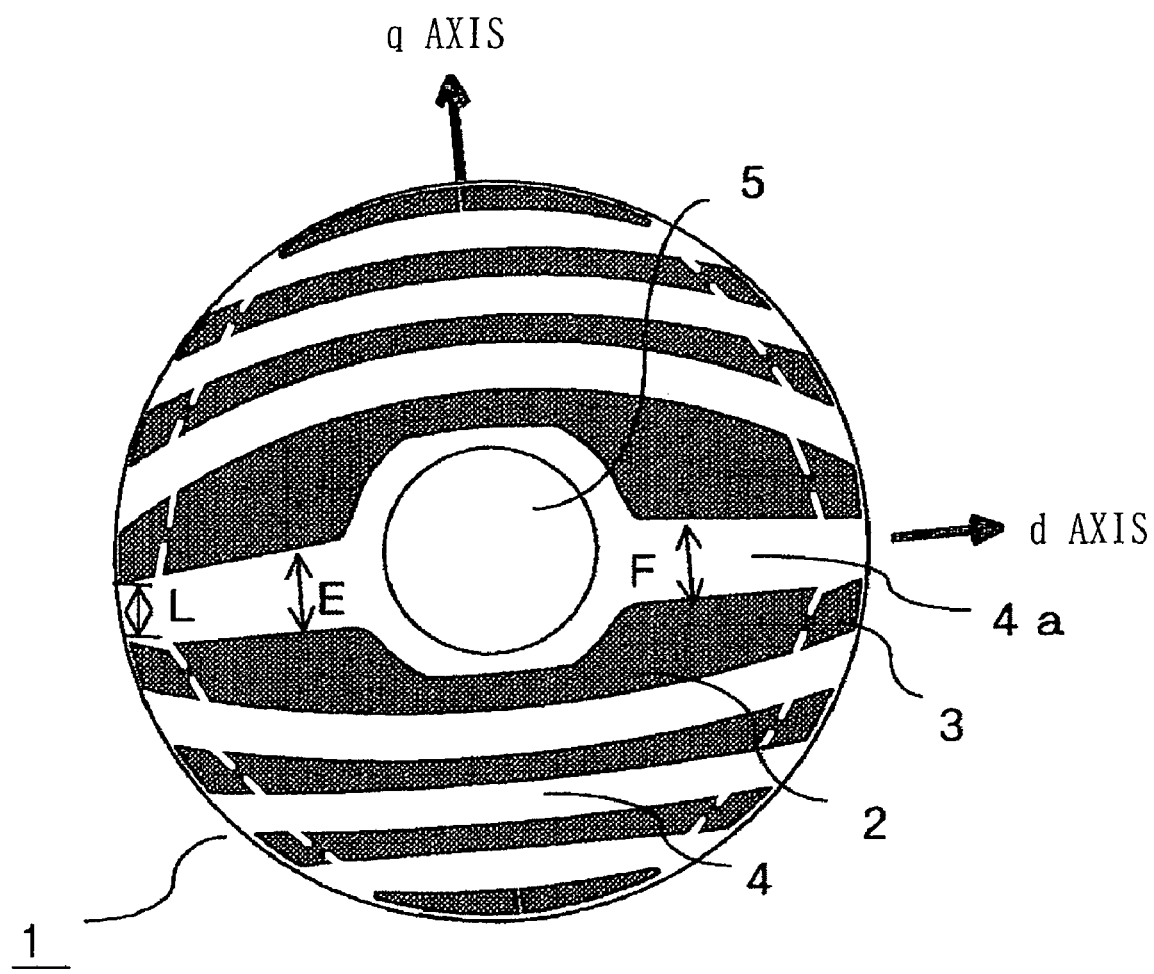
FIG. 6 is a cross sectional structural view showing another rotor of the synchronous induction motor according to the first embodiment.

FIG. 6 is a cross sectional structural view showing a rotor of another structure of the synchronous induction motor according to the first embodiment. This rotor 1 is structured not to have a gas vent hole, and a shape of a slit 2 next to the shaft 5 is projected along the circumference of the shaft 5 at the shaft 5 side. In this rotor 1, widths of the magnetic paths on the d axis except for a proximity of the shaft are set almost similar such as a width L, a width E, and a width F; or the width E and the width F are made a little larger than the width L.

In this way, this rotor 1 is structured so that, among the magnetic paths on the d axis, the width L located at the outermost circumferential edge is made to be a narrow size that does not generate the magnetic saturation at the time of operation, and the widths E and F of the magnetic paths on the d axis except for the proximity of the shaft are made as narrow as the predetermined width L. Then, if a nonmagnetic portion is formed in a reduced amount of the magnetic path, it is possible to obtain a structure in which the magnetic flux can hardly pass in the direction of q axis, while the passability of the magnetic flux in the direction of d axis is maintained. Accordingly, the salient pole difference can be increased between the d axis and the q axis, so that a rotor of the highly efficient synchronous induction motor can be obtained.

Here, in case of setting the width L of the electromagnetic steel sheets on the d axis at the outer circumferential edge to a predetermined width that does not generate the magnetic saturation at the time of operation, in consideration of B-H characteristics, etc., the predetermined width L can be set to have a little margin to the state of magnetic saturation in the magnetic flux density for the strength of the magnetic field of the electromagnetic steel sheets. In this case, if the predetermined width L is broadened, the magnetic flux density at this part is large enough; however, the passability of the magnetic flux in the direction of q axis is also increased, since the width L is large. The predetermined width L is preferably set to a narrow size that does not generate the magnetic saturation.

In FIG. 6, the width of the slit next to the shaft 5 is broadened; however, another nonmagnetic portion can be provided, while the shape of the slit remains unchanged. This nonmagnetic portion can be a space, or as well as the slit, nonmagnetic material such as aluminum can be filled in it.

Figure 7:
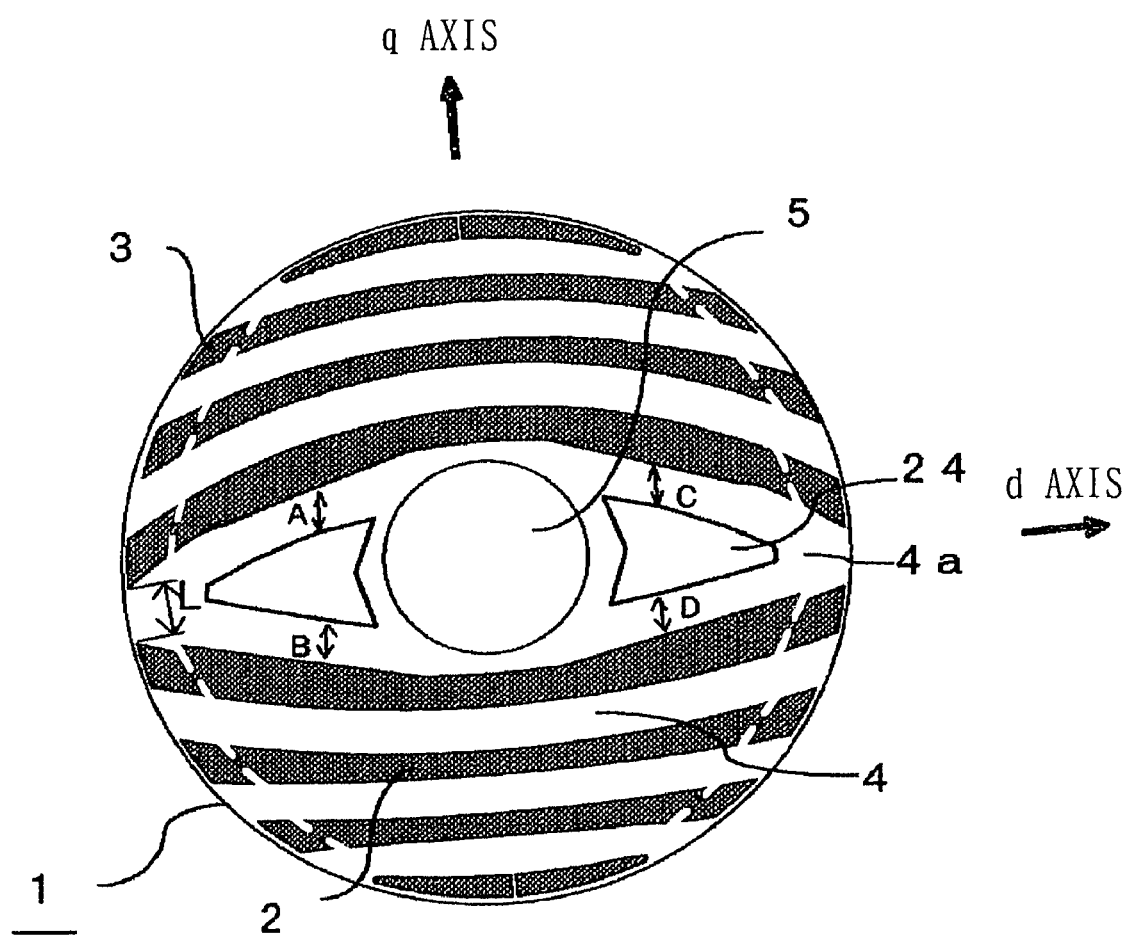
FIG. 7 is a cross sectional structural view showing another rotor of the synchronous induction motor according to the first embodiment.

FIG. 7 shows a structural example in which a nonmagnetic portion 24 is provided on a strip 4a on the d axis. In this structure, since the magnetic path on the d axis passes around a circumference of the nonmagnetic portion 24, "a distance A+a distance B" and "a distance C+a distance D" should be set to almost equal to or a little greater than the distance L. Also in this structure, the magnetic path can be formed on the d axis that does not generate the magnetic saturation, and at the same time, the magnetic flux can hardly pass in the direction of q axis. The nonmagnetic portion 24 can be filled with nonmagnetic material such as aluminum as well as the slots 3, but the nonmagnetic portion 24 also can be a space. When it remains as a space, the nonmagnetic portion 24 can be functioned as a gas vent hole in an apparatus that requires the gas vent hole.

In this embodiment, the slits 2 are curved so as to surround the shaft, and the width of the magnetic path on the d axis is the narrowest at the outer circumferential edge. Consequently, if the width L of the magnetic path at the outer circumferential edge is made to be a narrow size that does not generate the magnetic saturation, and widths of the other parts of the magnetic path on the d axis are set not narrower than the width L based on this width L, it is possible to obtain a highly efficient synchronous induction motor without generating the magnetic saturation.

In this way, a rotor iron core formed by laminating a plurality of electromagnetic steel sheets, at least one pair of slits 2 provided on the electromagnetic steel sheets to form a magnetic pole projection so as to obtain a d axis that is a direction in which the magnetic flux easily flows and a q axis that is a direction in which the magnetic flux hardly flows, a plurality of slots 3 connected to the slits 2 and provided adjacent to an outer circumference of the electromagnetic steel sheets so as to generate an induction torque, conductive material filled in at least the slots 3 among the slits 2 and the slots 3, and a shaft 5 which is an axis of rotation provided at a center part of the rotor iron core are included, and by setting a width L of the electromagnetic steel sheets at an outer circumferential edge which form a magnetic path on the d axis to a predetermined width that does not generate the magnetic saturation, and by providing a nonmagnetic portion having a width equal to or greater than the predetermined width L, it is possible to increase a salient pole difference between the d axis and the q axis, so that a rotor of a synchronous induction motor having good characteristics can be obtained.

Embodiment 2

Figure 8:
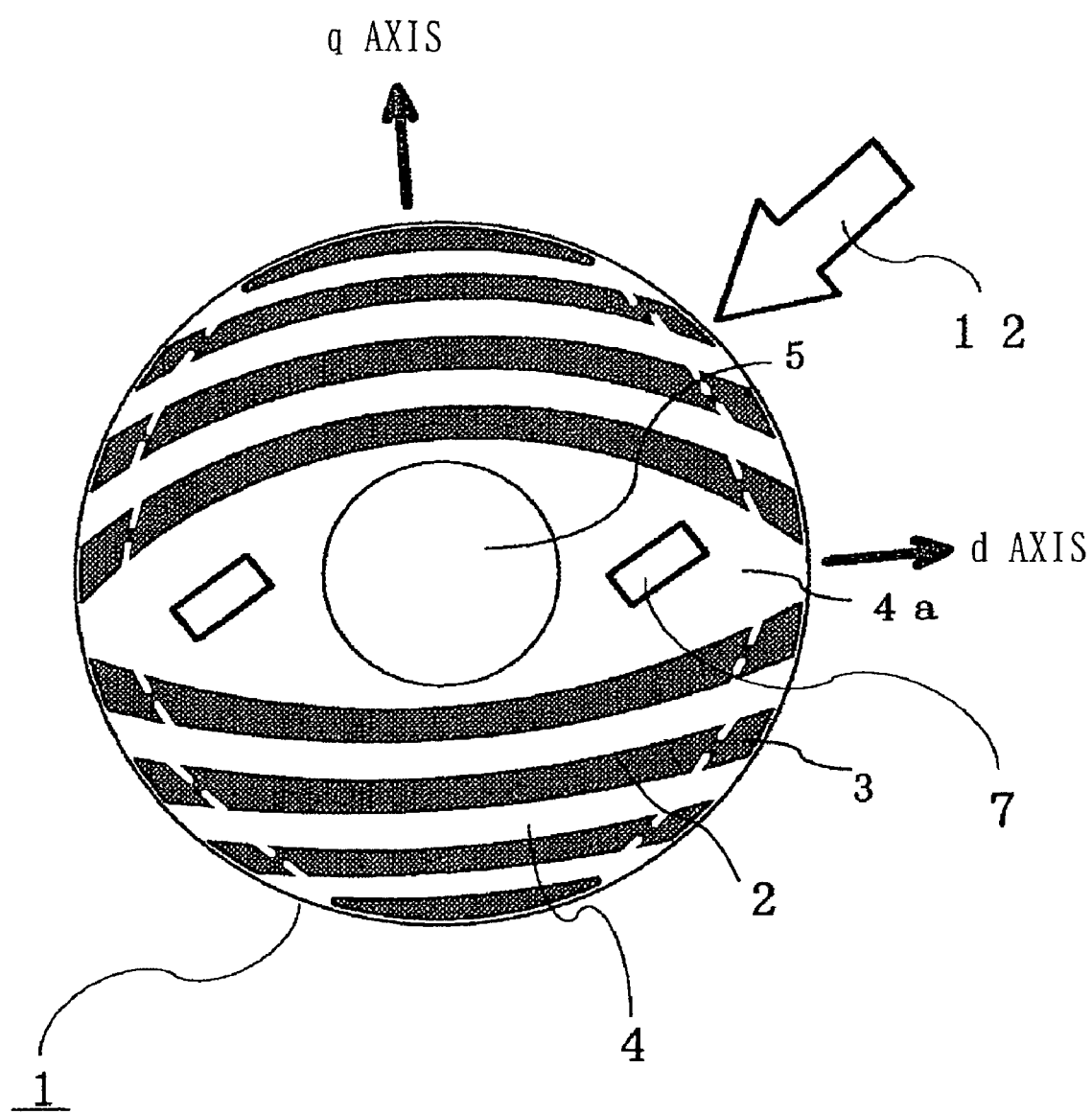
FIG. 8 is a cross sectional structural view showing a rotor of a synchronous induction motor according to the second embodiment.

Hereinafter, the second embodiment will be explained by referring to the figures. FIG. 8 is a cross sectional structural view showing a rotor 1 of a synchronous induction motor according to the second embodiment. FIG. 8 is a structure in which a gas vent hole 7 has a slender opening that is stretched in a direction displaced by a predetermined angle from a d axis so as to approximately match the gas vent hole 7 to an angle of an entering direction of magnetic flux.

An entering direction 12 of the magnetic flux is a direction that is displaced from the d axis by a predetermined angle in the synchronous induction motor during synchronous rotation. When the magnetic flux enters from an angle which is displaced towards the q axis from the d axis by, for example, around 45 degrees in electric angle, a longitudinal direction of the gas vent hole 7 is placed by slanting from the d axis by around 45 degrees. Due to this, the magnetic flux that has entered from the entering direction 12 flows along the circumference of the gas vent hole 7, so that the magnetic flux can easily flow. This enables to reduce a loss around the gas vent hole 7 and to obtain a highly efficient synchronous induction motor. By providing the gas vent hole on the d axis having a slender opening that is stretched in the direction displaced from the d axis by a predetermined angle, it is possible to obtain a synchronous induction motor with efficiency to some extent. In particular, this effect can be increased if the angle of the gas vent hole 7 is approximately matched to an entering angle of the magnetic flux at the time of steady operation of the synchronous induction motor.

Here, the displaced angle between the entering direction of the magnetic flux during the synchronous rotation and the d axis can be set previously by simulation or operation of a test model, etc. This entering direction of the magnetic flux is normally around 0 through 45 degrees in electric angle towards the q axis from the d axis.

Figure 9:
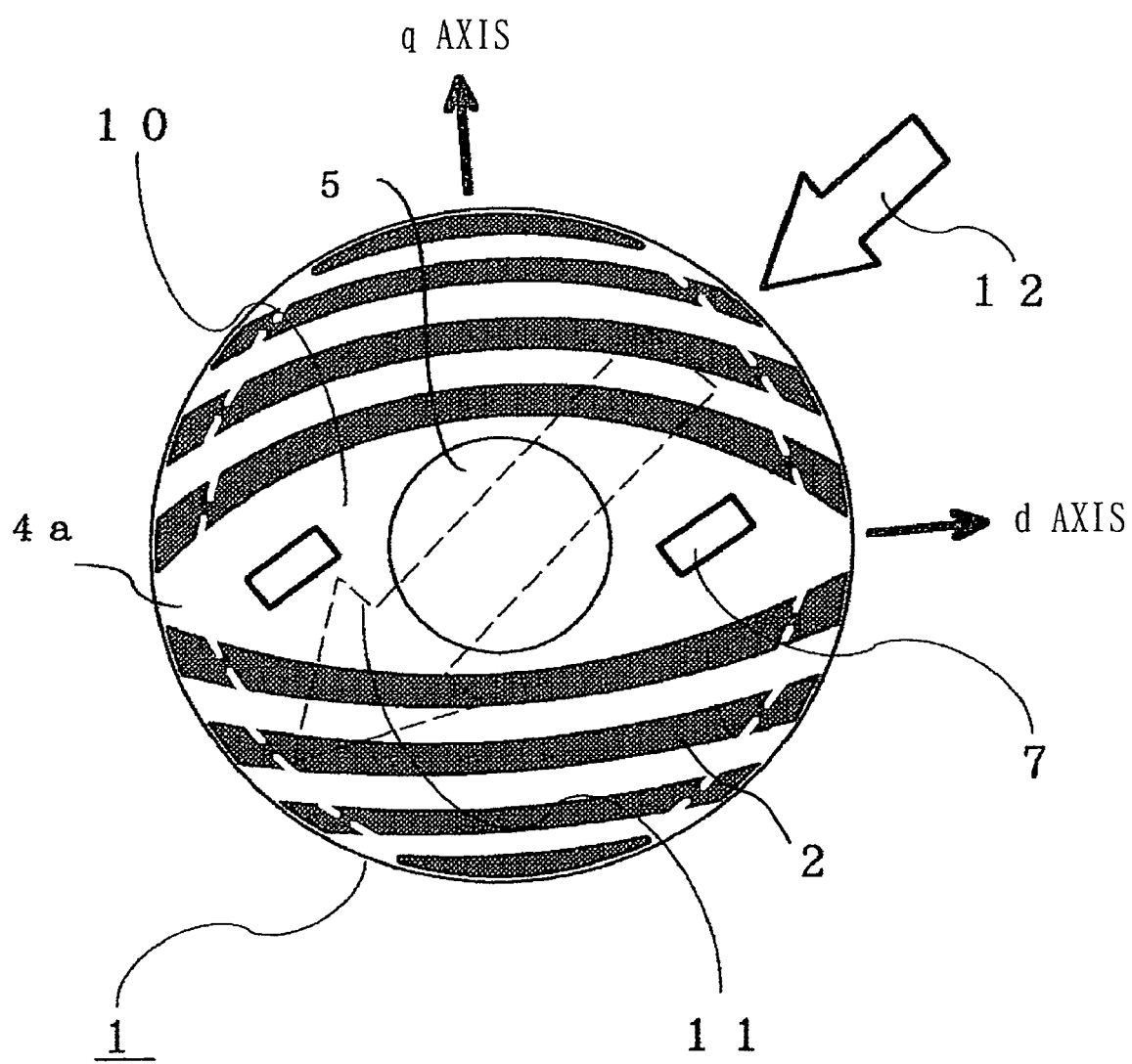
FIG. 9 is a cross sectional structural view showing another rotor of the synchronous induction motor according to the second embodiment.

Moreover, if an easily magnetizable direction 11 is displaced from the d axis by a predetermined angle using grain oriented electromagnetic steel sheets 10 as shown in FIG. 9, the magnetic flux can pass easily in a flowing direction of the magnetic flux, and thus a highly efficient synchronous induction motor can be obtained. In particular, by approximately matching an angle of the easily magnetizable direction 11 of the grain oriented electromagnetic steel sheets to an entering angle of the magnetic flux at the time of steady operation of the synchronous induction motor, the effect can be further increased.

Figure 10:
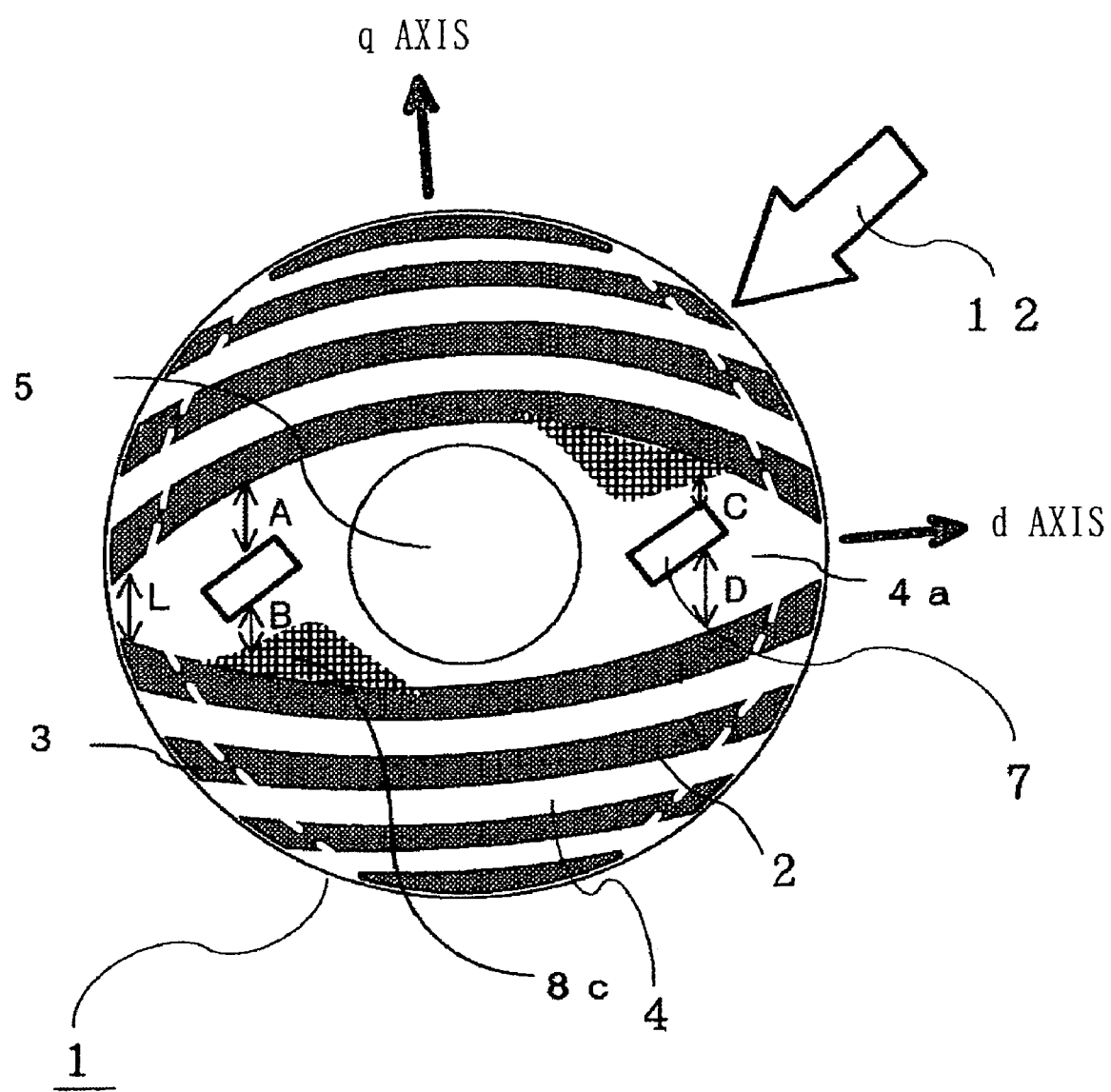
FIG. 10 is a cross sectional structural view showing another rotor of the synchronous induction motor according to the second embodiment.

As shown in FIGS. 8 and 9, in a structure in which the gas vent hole 7 has a shape that is stretched in the direction of d axis and further the longitudinal direction is approximately matched to the entering direction of the magnetic flux at the time of steady operation, the shape of the slit 2 next to the shaft 5 can be projected at the shaft side so as to form an extended part of slit 8c at the electromagnetic steel sheets of the strip 4a on the d axis so that the magnetic flux can hardly flow in the direction of q axis. FIG. 10 shows an example of this structure.

FIG. 10 is a structural example of providing an extended part of slit 8c at a comparatively broad part of the electromagnetic steel sheets of the strip 4a on the d axis of the rotor 1 formed as shown in FIG. 8. In this way, when the extended part of slit 8c is formed along the circumference of the shaft 5 and the circumference of the gas vent hole 7, it is accomplished to form the gas vent hole 7 having a shape which allows the magnetic flux to easily pass in the direction of d axis, and at the same time, the magnetic flux can hardly pass in the direction of q axis, and thus the salient pole difference can be increased. Further, an area of the opposite side to the part of the electromagnetic steel sheets on which the extended part of slit 8c is provided is reduced by a slanted amount of the gas vent hole 7, and a slit can be projected along the circumference of the shaft 5 also in this part. The salient pole difference between the direction of d axis and the direction of q axis is increased, which enables to obtain a highly efficient synchronous induction motor. The same can be said also in case of FIG. 9.

As well as the first embodiment, also in this embodiment, in case of keeping the outer circumference size L of the rotor on the d axis to a narrow distance that does not generate the magnetic saturation while the synchronous induction motor operates, if the distance between the gas vent hole 7 and the extended part of slit 8c is smaller than the distance L between the slits, the magnetic saturation occurs, and the characteristics deteriorate. Therefore, by setting the relationship among the distances A, B, C, and D between the extended part of slit 8c and the gas vent hole 7 to L≦A+B, L≦C+D, the occurrence of the magnetic saturation can be prevented.

Further, in FIGS. 8 and 9, the shape of the shaft 5 can be deformed so that the length in the direction of q axis should be shorter than the length in the direction of d axis, and a slit next to the shaft 5 is extended by shortened amount by making the width of the slit projected on the d axis. By structuring in this way, the salient pole difference between the q axis and the d axis can be increased, and the characteristics can be improved.

In the first and second embodiments, in FIG. 1, FIGS. 3 through 6, and FIG. 10, the width of the nonmagnetic portion in the direction of q axis is extended by making the shape of a slit 2 next to the shaft 5 projected towards the shaft 5; however, this is not only the case. As shown in FIG. 7, the shape of the slit 2 remains unchanged, and a new nonmagnetic portion can be provided. Further, the newly provided nonmagnetic portion and the slits 2 or the slots 3 can be at least partially connected. By connecting a part of the slits 2 or the slots 3 and a part of the nonmagnetic portion, nonmagnetic material such as aluminum can be filled in the nonmagnetic portion simultaneously at the time of die casting.

Embodiment 3

Figure 11:
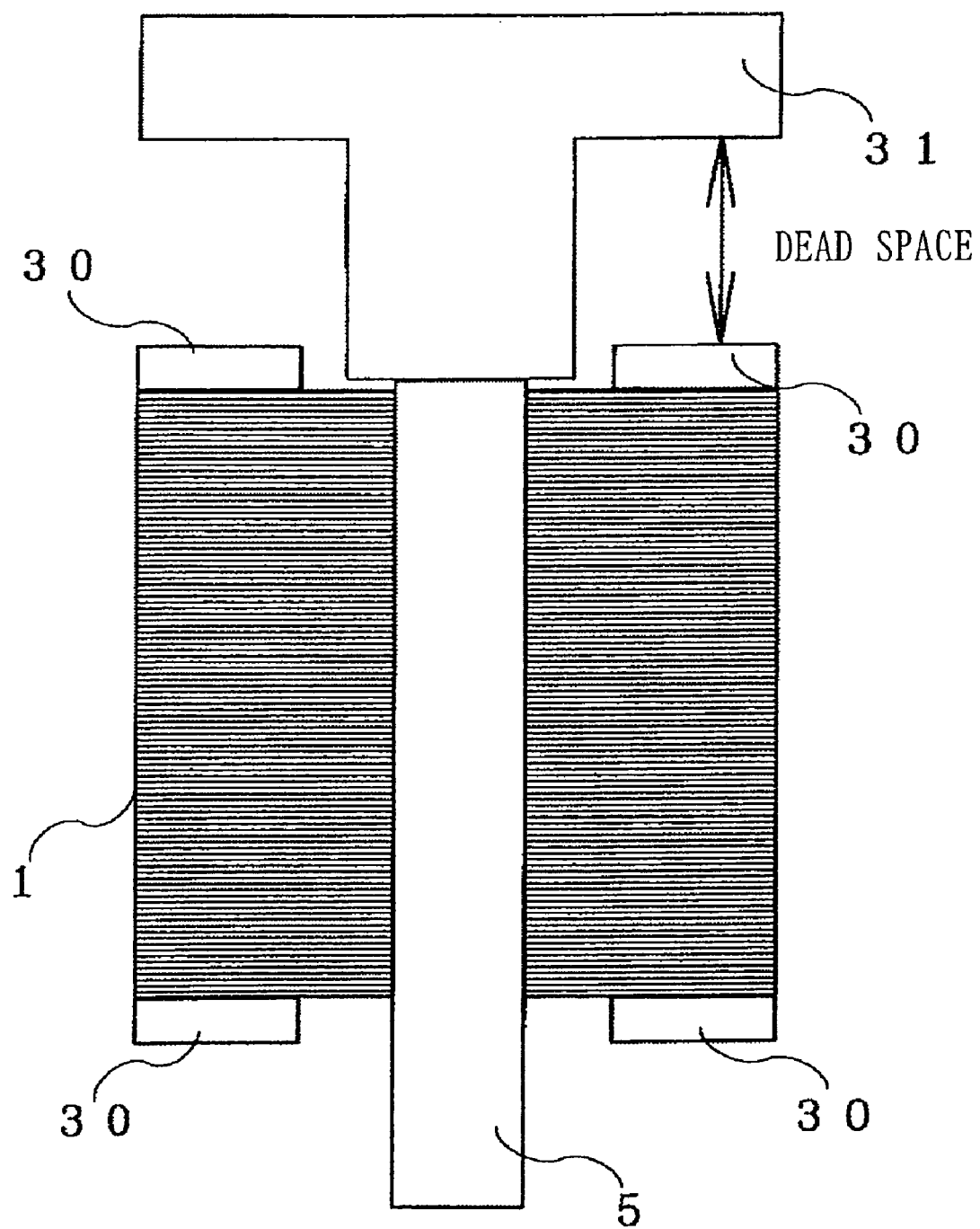
FIG. 11 is an explanatory drawing for comparing and explaining a rotor of a synchronous induction motor according to the third embodiment.

Hereinafter, the third embodiment of the present invention will be explained by referring to the figures. FIG. 11 is a vertical cross sectional view of the state in which a mechanism 31 that has a diameter being larger than the diameter of the shaft is provided in the rotor 1 above the shaft 5. In case of rotating an existing apparatus as shown in the figure by a synchronous induction motor, if the existing mechanism 31 is tried to be attached to it, a dead space is present between the end ring 30 of the rotor 1 and the mechanism 31. In this embodiment, by embedding a top portion of the mechanism 31 in the center of the rotor 1, the dead space is eliminated and downsizing is achieved.

Here, the rotor is divided into two parts: an upper rotor iron core 13 corresponding to a part to which the mechanism 31 is to be embedded; and a lower rotor iron core 14 corresponding to the other part. A gap for the mechanism 31 is provided at a center part of rotation of the upper rotor iron core 13, and the lower rotor iron core 14 can be structured as a normal rotor having slits and slots. This is not the only case, but the rotor described in the first or second embodiment can be used.

Figure 13:
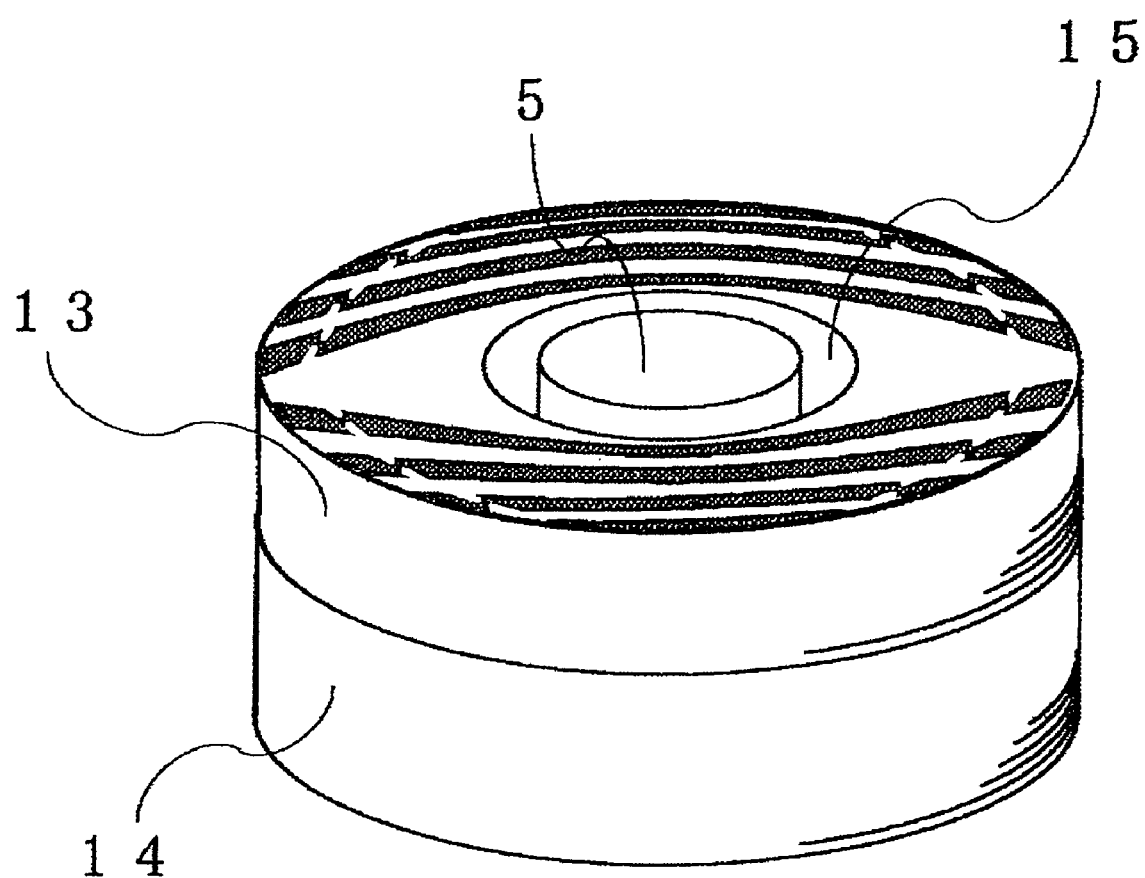
FIG. 13 is a slanted view showing a rotor of the synchronous induction motor according to the third embodiment.
Figure 14:
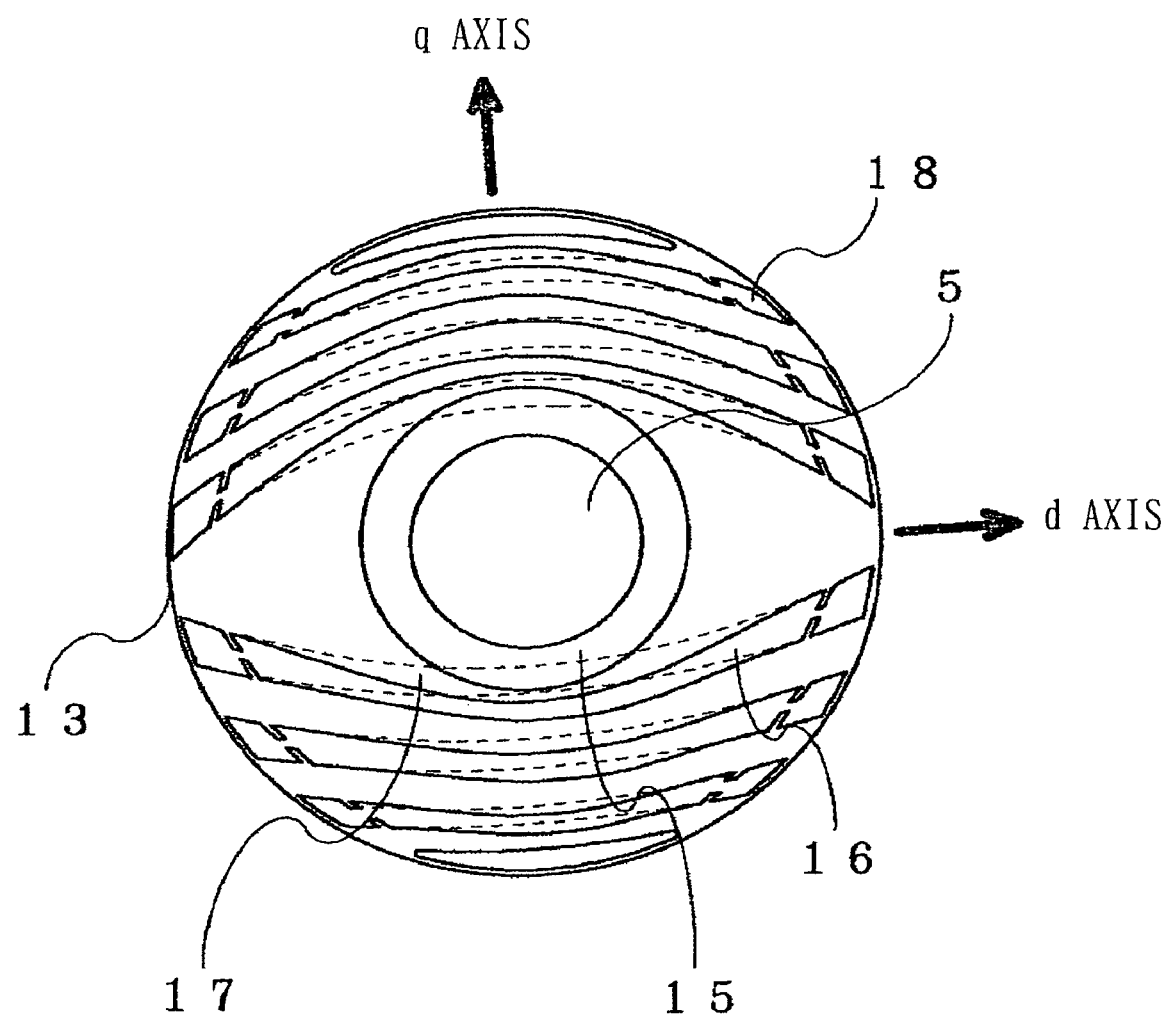
FIG. 14 is a cross sectional structural view showing an upper rotor according to the third embodiment.

FIG. 13 is a slanted view showing the upper rotor iron core 13 and the lower rotor iron core 14. Further, FIG. 14 is a cross sectional view showing the upper rotor iron core 13. Further, FIG. 15 is a cross sectional structural view showing the lower rotor iron core 14.

Figure 15:
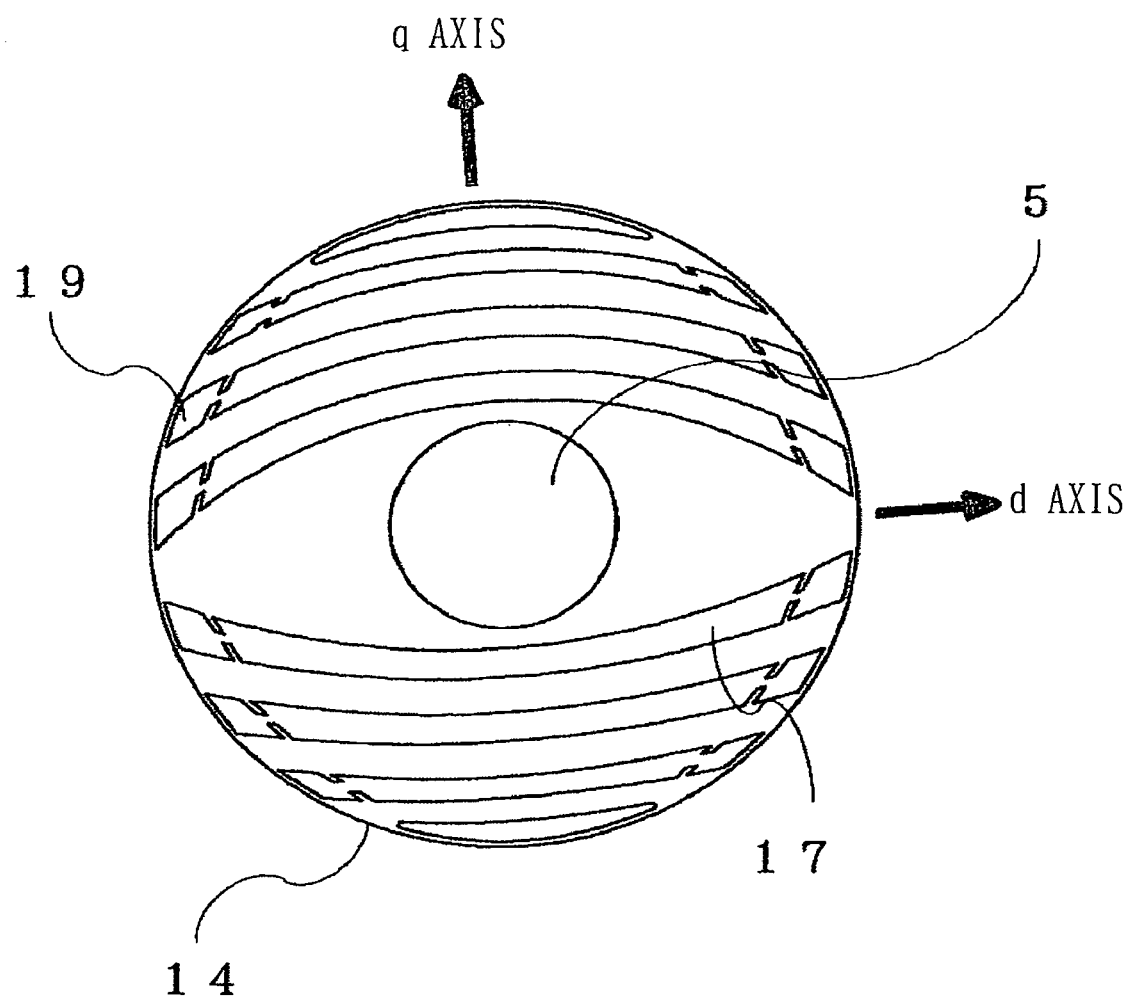
FIG. 15 is a cross sectional structural view showing a lower rotor according to the third embodiment.

A lower slit 17 and a lower slot 19 in the lower rotor iron core 14 shown in FIG. 15 are formed without an extended part of slit 8a shown in, for example, FIG. 1. An upper slot 18 of the upper rotor iron core 13 shown in FIG. 14 is placed so that at least a part of the slot should be overlapped with the lower slot 19, and an upper slit 16 connected to the upper slot 18 is a little deformed. The slit drawn by a dotted line in FIG. 14 shows a location of the lower slit 17 of the lower rotor iron core 14. A gap for embedding the mechanism 31 is provided at the rotor center part 15 except for the shaft 5, and the upper slit 16 is placed avoiding the rotor center part 15. Then, a part of the lower rotor iron core 14 that is located below the embedded mechanism 31 in the laminating direction is penetrated by a normal shaft 5 without a gap provided around the shaft of the rotor center part.

If the rotor is formed only by the upper rotor iron core 13, the magnetic path of the d axis is interrupted to degrade the saliency because air exists in a hole of the center part, and the characteristics of the synchronous induction motor deteriorate. However, if the rotor is divided in the laminating direction and composed as shown in FIG. 13 by combining with the form in which the magnetic path of the d axis is secured as the lower rotor iron core 14, the magnetic paths can be formed by the upper rotor iron core 13 and the strip of the lower rotor iron core 14, since the magnetic flux can flow three dimensionally. Even if the rotor is formed to have the upper slit 16 due to the limitation caused by the mechanism 31 as shown in FIG. 14, the magnetic paths can be secured by combining with the lower rotor iron core 14, and a highly efficient synchronous induction motor can be obtained.

Moreover, if the rotor is formed by laminating plural rotor iron cores as shown in FIG. 13, the magnetic flux flows three dimensionally, that is, the magnetic flux does not flow in only a certain direction. Therefore, the magnetic paths can be multidirectional and more averaged than a case in which the magnetic flux flows two dimensionally, which may reduce noise or vibration at the time of rotation.

Figure 16:
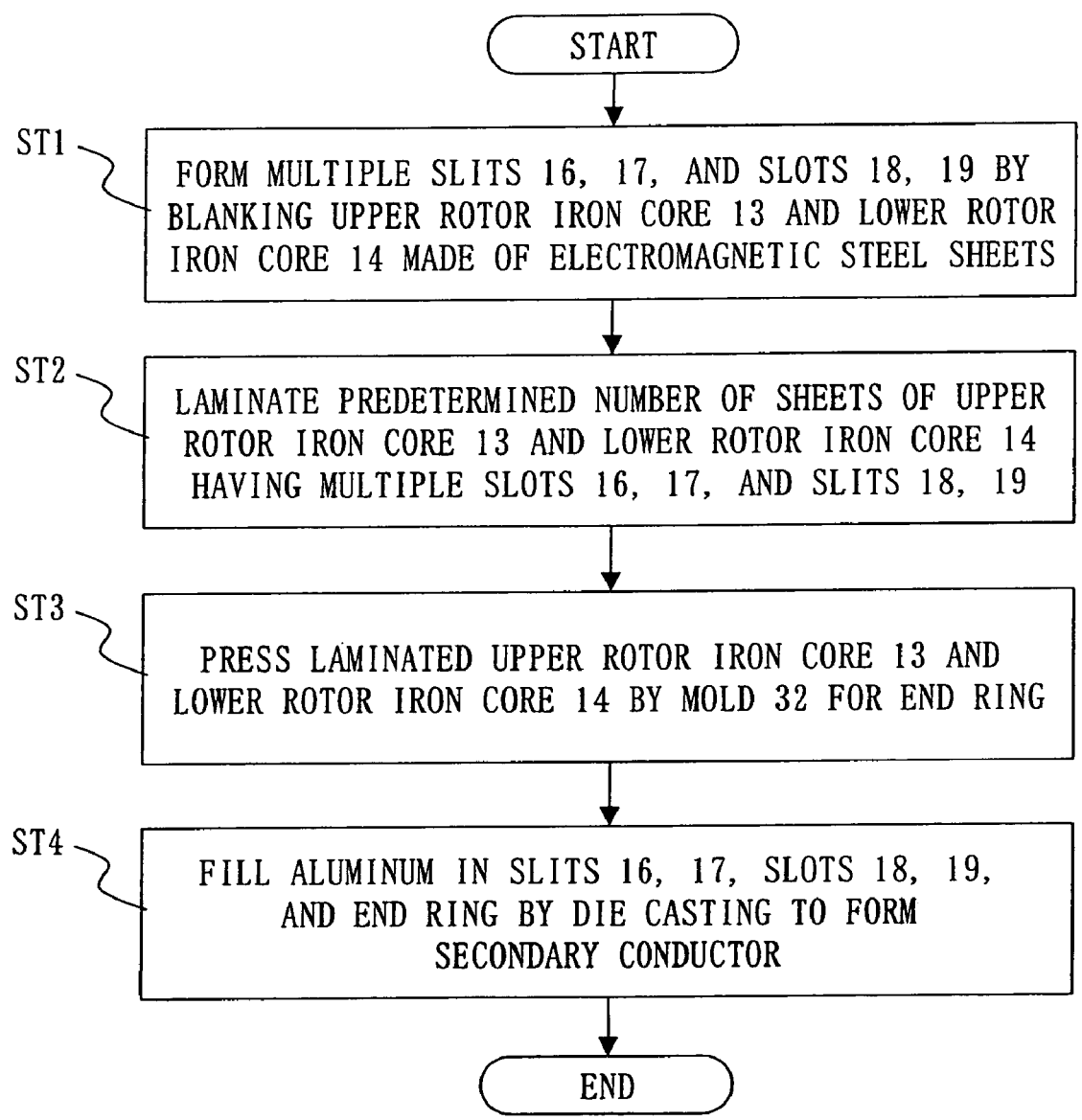
FIG. 16 is a flowchart showing manufacturing process of the rotor of the synchronous induction motor according to the third embodiment.
Figure 17:
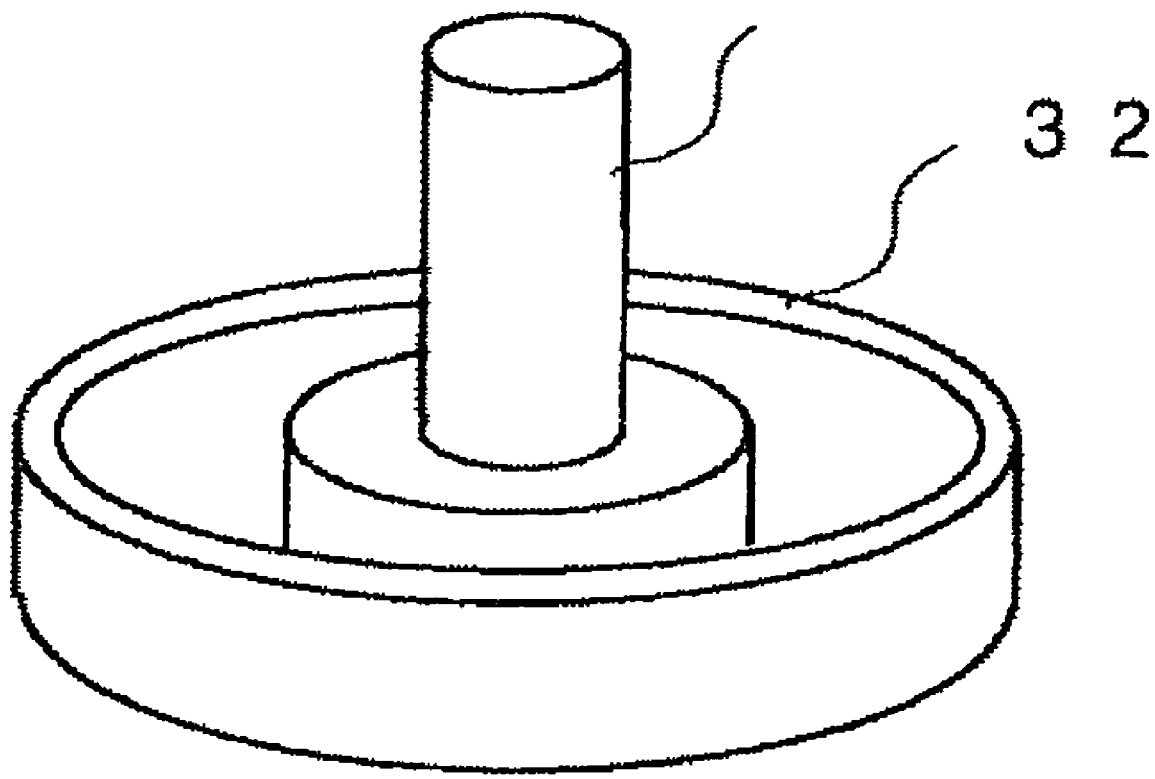
FIG. 17 is a slanted view showing an end ring die according to the third embodiment.

Hereinafter, a manufacturing process of this rotor will be explained. FIG. 16 is a flow chart showing a manufacturing process to form slots and slits by aluminum with die casting. At step ST1, the upper rotor iron core 13 and the lower rotor iron core 14 made of the electromagnetic steel sheets are blanked, and multiple slits 16, 17 and slots 18, 19 are formed. At step ST2, a predetermined number of sheets of the upper rotor iron core 13 and the lower rotor iron core 14 are laminated. At step ST3, the laminated upper rotor iron core 13 and the lower rotor iron core 14 are pressed at an inside of the rotor center part 15 by a mold for end ring having the same shape as an inner diameter of the rotor center part 15. FIG. 17 is a slanted view showing one example of the mold 32 for end ring. This mold 32 for end ring has a projection 32a at the center part to form a gap for embedding the mechanism 31. Next, at step ST4, aluminum is infused from, for example, an upper inlet and filled in the slits 16, 17, the slots 18, 19, and the end ring 30 by die casting to form secondary conductor.

By carrying out die casting using the mold 32 for end ring as shown in FIG. 17, aluminum is filled and at the same time, a gap for embedding the mechanism 31 is certainly secured. The mechanism 31 is embedded in the gap of the rotor center part 15, so that downsizing as a whole can be achieved, and further it brings an effect to carry out rotating drive using a low cost and highly efficient synchronous induction motor.

Here, in case of filling aluminum by die casting in the slits 16, 17, and the slots 18, 19, at least a part of the upper slot 18, the lower slot 19, or the upper slit 16, the lower slit 17 should be communicable in the laminating direction on the upper and lower electromagnetic steel sheets of a portion where the upper rotor iron core 13 and the lower rotor iron core 14 are located next to each other. By making the slit or the slot communicable in the laminating direction, it is possible to fill aluminum in the slot and the slit simultaneously at the time of die casting.

Figure 18:
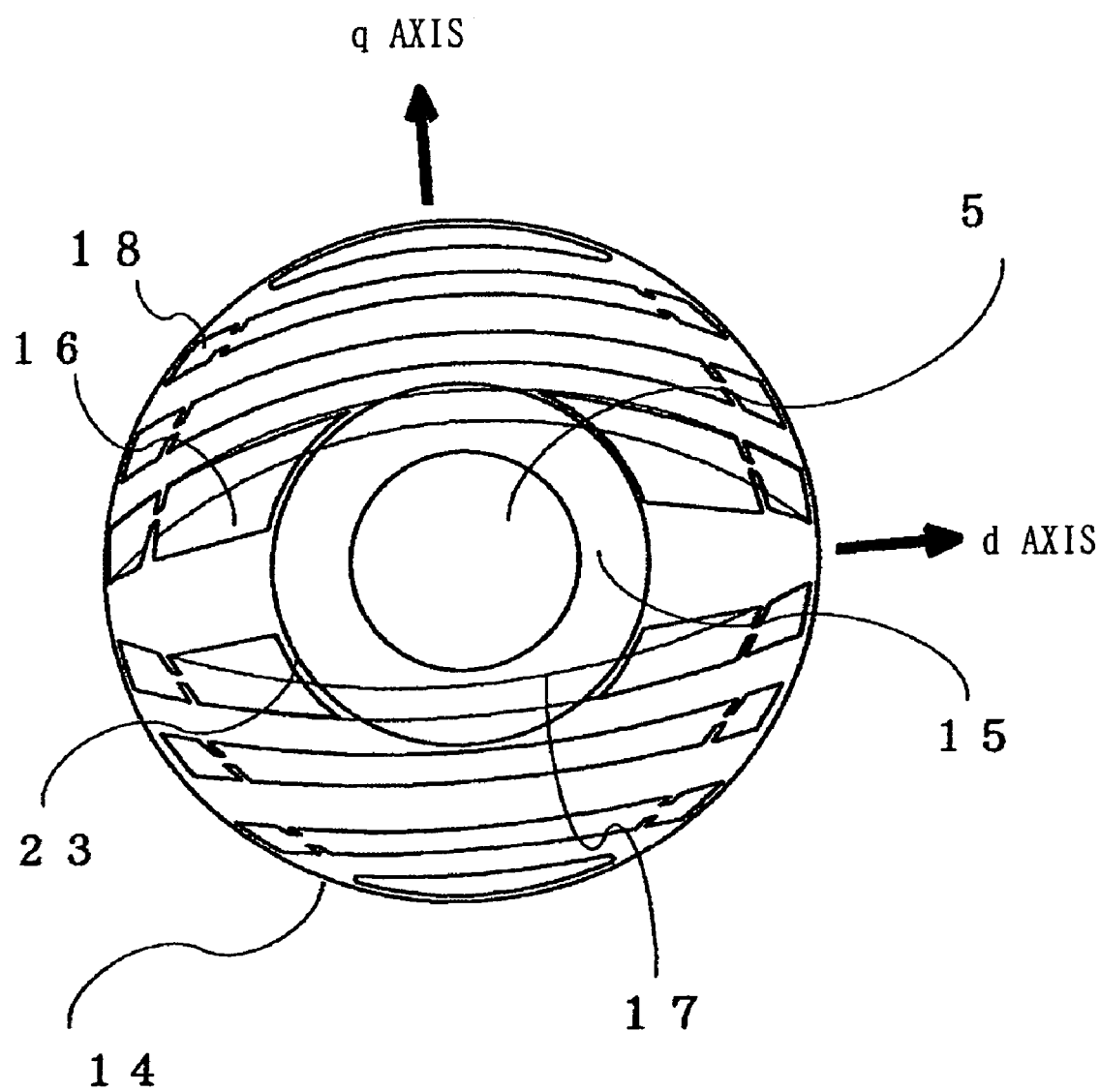
FIG. 18 is a cross sectional structural view showing another upper rotor according to the third embodiment.

Further, as shown in FIG. 18, even if the slit is discontinued so as to form the rotor center part 15, the die casting can be carried out if at least a part of the upper slot 18, the lower slot 19, or the upper slit 17, the upper slit 16, is communicable in the laminating direction. In addition, by combining with the lower rotor iron core 14 having a structure in which the magnetic paths are effectively arranged in the direction of d axis and the direction of q axis, the magnetic paths can be secured, and a highly efficient synchronous induction motor can be obtained. Further, the magnetic flux flows three dimensionally, which averages the magnetic paths multi-directionally, and the noise and vibration can be reduced at the time of rotation.

In particular, even if the upper slit 16 is formed discontinuously at the rotor center part 15 as shown in FIG. 18, in case of die casting, aluminum does not leak into the rotor center part 15 by providing a thin-walled portion 23 between the upper slit 16 and the rotor center part 15. However, in case of filling aluminum by die casting in the upper rotor iron core 13, the thin-walled portion 23 may be expanded by pressure caused by die casting of aluminum. Accordingly, upon die casting, by using the mold 32 for end ring having the projection 32a, the expansion of the thin-walled portion can be suppressed.

In another way, even if the thin-walled portion 23 does not exist, if the projection 32a of the mold 32 for end ring which is used at the time of die casting is formed in the same shape as the rotor center part 15, aluminum does not leak into the rotor center part 15, and it is possible to certainly fill aluminum in the necessary parts.

Figure 12:
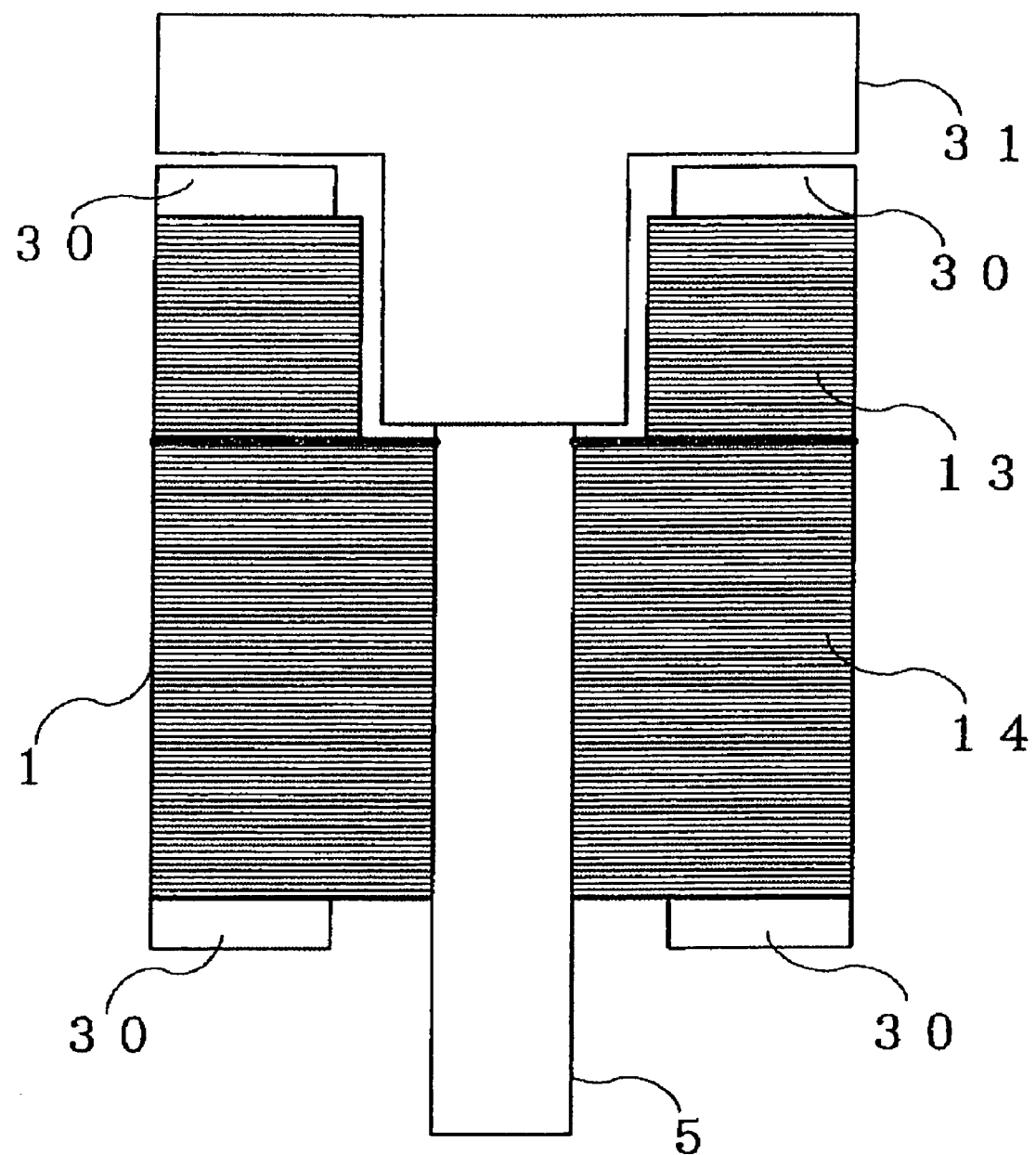
FIG. 12 is a cross sectional structural view showing a rotor of the synchronous induction motor according to the third embodiment.

Further, in FIGS. 14 and 18, the upper rotor iron core 13 has a cross section formed circular because of necessity of the mechanism 31, but this is not the only case, and the same can be said if a necessary form is other than a circle, for example, an oval or a polygon depending on the shape of the existing mechanism 31. Namely, the gap of the rotor center part 15 can be matched to its form. Then, by combining with the rotor iron core such as the lower rotor iron core 14 shown in FIG. 12 which secures the magnetic path of the d axis, a highly efficient synchronous induction motor can be composed.

In this way, a rotor iron core formed by laminating a plurality of electromagnetic steel sheets, at least one pair of slits provided at the rotor iron core to form a magnetic pole projection so as to obtain a d axis that is a direction in which the magnetic flux easily flows and a q axis that is a direction in which the magnetic flux hardly flows, a plurality of slots connected to the slits and provided adjacent to an outer circumference of the rotor iron core to generate an induction torque, conductive material filled in at least the slots among the slits and the slots, and a shaft 5 which is an axis of rotation penetrated at a center part of the rotor iron core are included, and by dividing the plurality of electromagnetic steel sheets into plural portions in the laminating direction, and forming slits 16, 17, and slots 18, 19 having different shapes for the divided portions 13, 14, respectively, a highly general-purposed synchronous induction motor can be obtained, which can be applied to various mechanisms and widely used without impairing the function of the synchronous induction motor.

Further, if the electromagnetic steel sheets of the divided portions, in particular, located at the end of the laminating direction are formed to have a gap available to insert another mechanism around the shaft 5, it is possible to obtain a synchronous induction motor easily adaptive to another mechanism.

Further, at a portion in which electromagnetic steel sheets having different shapes are located next to each other, at least a part of the slit 16 and the slot 18 of one side and at least a part of the slit 17 and the slot 18 of the other side are made communicable in the laminating direction, so that it is easily fill conductive and nonmagnetic material in the slots 18, 19, and the slits 16, 17 using the same manufacturing process as the conventional one.

Figure 19:
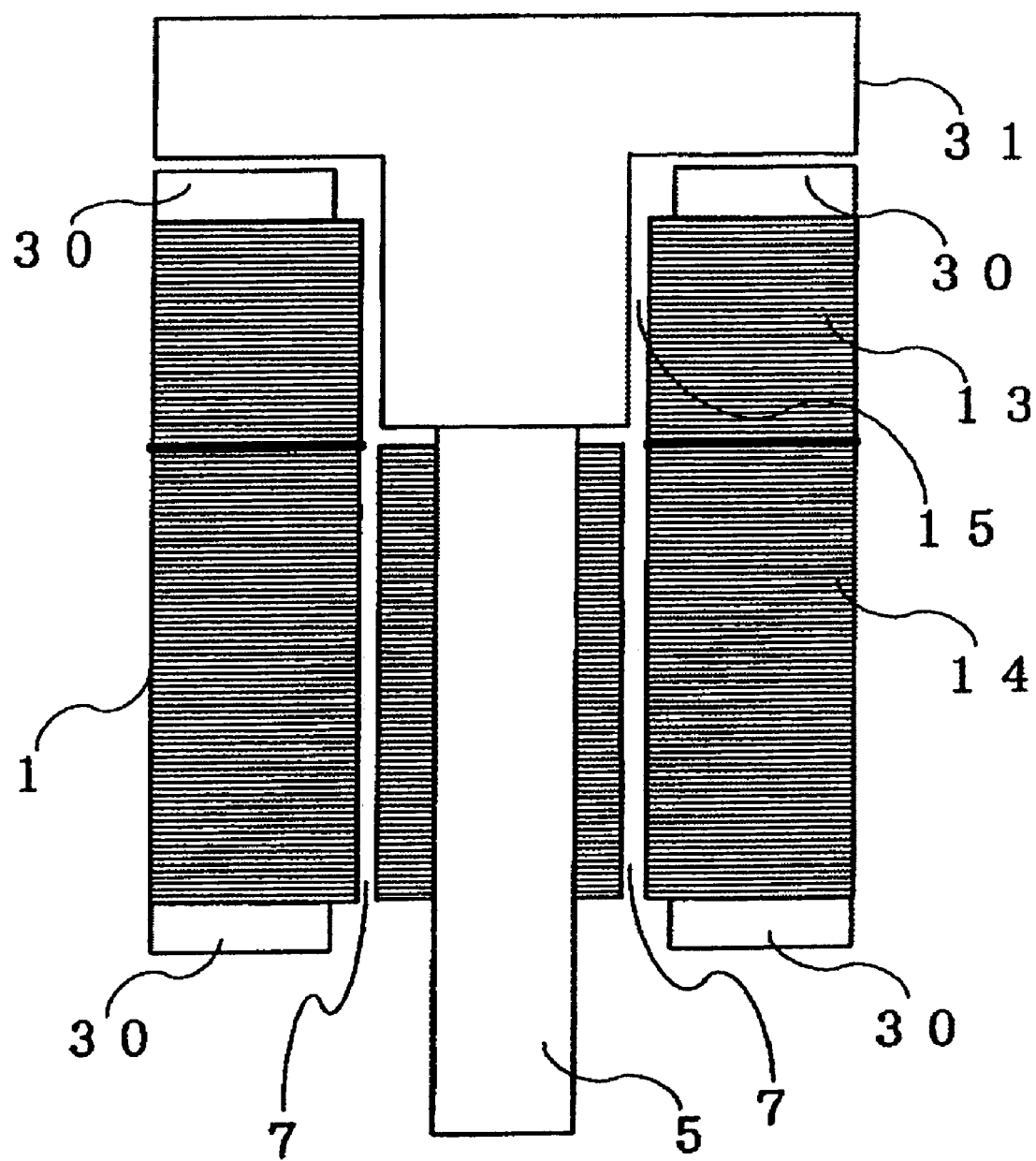
FIG. 19 is a vertical cross sectional view showing another rotor of the synchronous induction motor according to the third embodiment.

Further, FIG. 19 is a vertical cross sectional view showing the rotor 1 structured to embed the mechanism 31, which is a rotor of a compressor, etc. that requires the gas vent hole 7 to pass gaseous body such as gas or liquid such as oil. In the upper rotor iron core 13, the gas vent hole 7 can be made by using a space formed around the mechanism 31 in the rotor center part 15 without providing a specific gas vent hole. In this way, it is possible to omit room for the gas vent hole by using the space of the rotor center part 15 in the upper rotor iron core 13.

Figure 20:
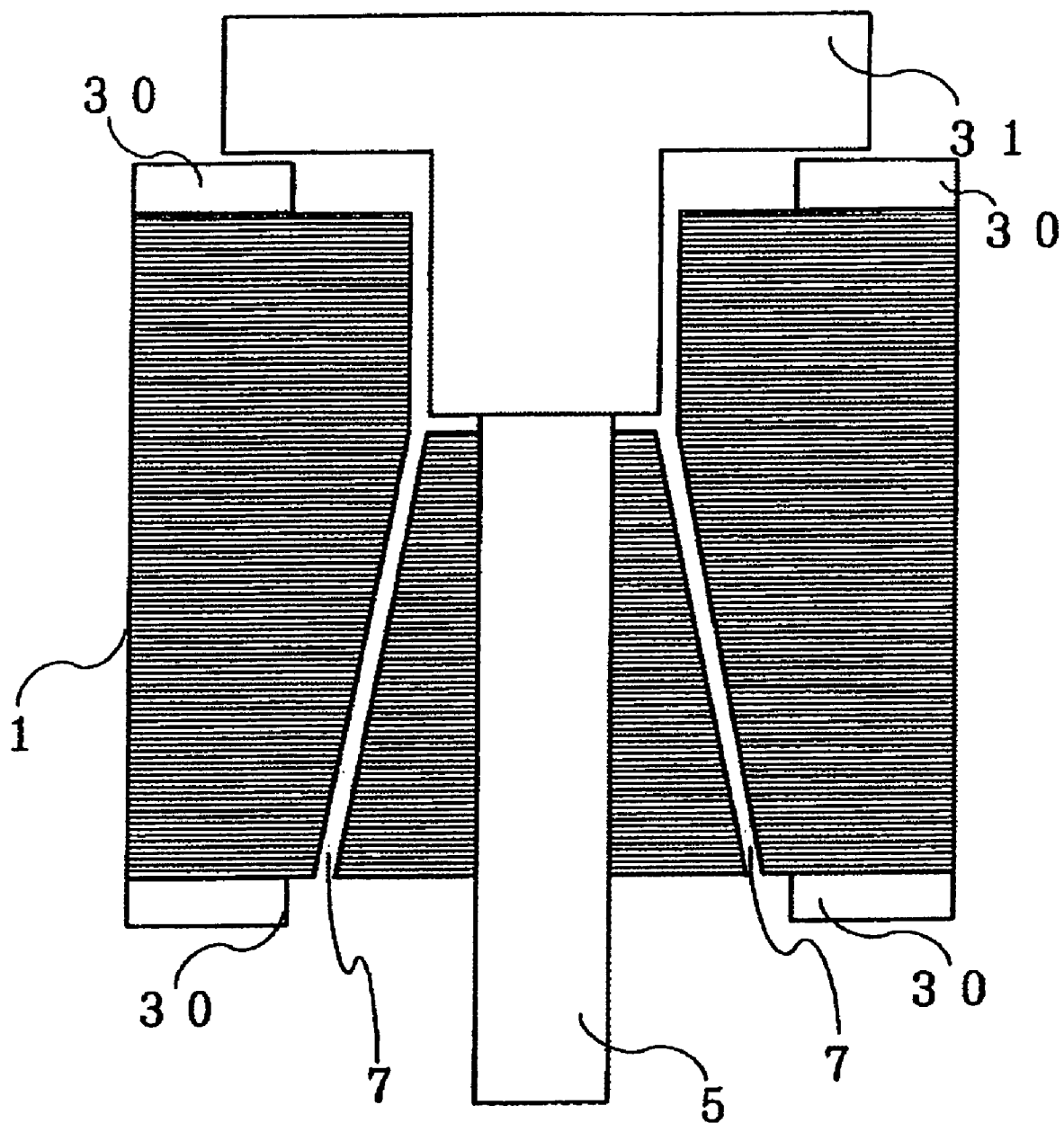
FIG. 20 is a vertical cross sectional view showing another rotor of the synchronous induction motor according to the third embodiment.

Further, the location of the gas vent hole 7 can be displaced, slanted for example, with keeping communicable state in the laminating direction as the gas vent hole 7 of the lower rotor iron core 14 shown in FIG. 20. By slanting the gas vent hole 7 with keeping communicable state in the laminating direction, it is possible to distribute the magnetic paths that have been interrupted by the gas vent hole 7, which reduces noise and vibration.

Figure 21:
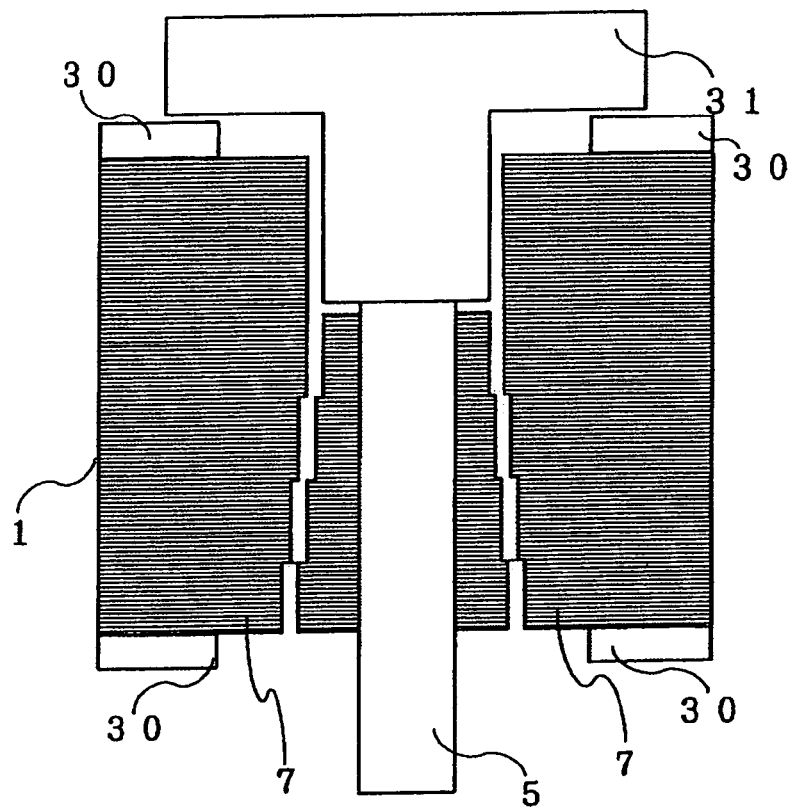
FIG. 21 is a vertical cross sectional view showing another rotor of the synchronous induction motor according to the third embodiment.

Further, the gas vent hole 7 shown in FIG. 21 is formed by plural displaced stairs with keeping communicable state in the laminating direction. By forming the gas vent hole 7 in stairs, it is possible to reduce the number of molds for the lower rotor iron core 14 compared with the structure of FIG. 20, which reduces the cost for the molds. Also in case of this structure of stairs, it is possible to distribute to some extent the magnetic paths that have been interrupted by the gas vent hole 7, which reduces noise and vibration.

Further, the rotor 1 as shown in FIGS. 12, 19, 20, and 21 is divided into two in the laminating direction and composed by combining rotor iron cores having two kinds of shapes; however, when a rotor needs to have at least three kinds of shapes, at least three kinds of rotor portions can be combined in the laminating direction.

Further, although in FIGS. 12, 19, 20, and 21, the gap to which the mechanism 31 is embedded is provided at the upper rotor iron core 13, and the lower rotor iron core 14 has a structure in which only the shaft 5 exists in the center part, the same effect as the above can be obtained by a structure in which the upper rotor iron core and the lower rotor iron core are exchanged.

Here, a part to which the mechanism 31 is embedded can be the top end portion or the bottom end portion of the rotor. The electromagnetic steel sheets of the rotor iron core located at one end in the laminating direction are formed to have a gap around the shaft, so that it is possible to mount the highly efficient synchronous induction motor on various kinds of apparatuses at a low cost, and general versatility can be improved.

In the first through third embodiments, in almost all of the slots and slits, conductive material and also nonmagnetic material such as aluminum is filled, but this is not the only case. Since the slots generate induction torque at the time of starting operation, the conductive material should be filled in at least slots. The slits are nonmagnetic portion, and thus if the slits are not completely filled with aluminum, and furthermore even if the slits remain spaces, the slits can be the nonmagnetic portion, so that a highly efficient synchronous induction motor can be composed. However, by filling nonmagnetic material in the slits, the slits and the strips between the slits can be firmly fixed, so that it is possible to compose a strong rotor having mechanical strength against the centrifugal force at the time of rotation.

Further, here, the slits are filled with aluminum which is the same material filled in the slots; however, the material is not limited to this, and another nonmagnetic material can be filled in the slits.

Further, the nonmagnetic and conductive material is not limited to aluminum, but another material can be used such as copper.

Figure 22:
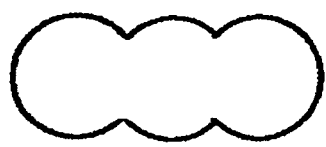
FIG. 22 is an explanatory drawing showing another shape of a gas vent hole according to the first through third embodiments.
Figure 23:
FIG. 23 is an explanatory drawing showing another shape of a gas vent hole according to the first through third embodiments.
Figure 24:
FIG. 24 is an explanatory drawing showing another shape of a gas vent hole according to the first through third embodiments.

Further, in case of the structure having the gas vent hole 7 in the first through third embodiments, the shape of the gas vent hole 7 can be a combination of plural circles as shown in FIG. 22, an oval as shown in FIG. 23, a polygon as shown in FIG. 24, and also the same effect can be obtained by forming with a combination of a plurality of them.

Further, although in the electromagnetic steel sheets of each figure discussed in the first through third embodiments, the shown slots are asymmetric, the effect can be apparent regardless of symmetry or asymmetry, and a highly efficient synchronous induction motor can be obtained. Further, although the ribs are provided between the slits and the slots in order to improve the starting characteristics of the rotor 1, the ribs may not be used for a model that satisfies the starting characteristics.

By mounting the rotor of the synchronous induction motor described in the first and second embodiments on a compressor, it is possible to operate the compressor using the highly efficient synchronous induction motor, and thus the operating efficiency of the compressor can be improved.

Furthermore, by mounting the rotor of the synchronous induction motor described in the third embodiment on a compressor, it is possible to operate the compressor using the highly efficient synchronous induction motor, and also a whole size of the compressor can be reduced, which brings an effect that vibration and noise can be reduced.

As discussed above, in a synchronous induction motor having a stator iron core formed by laminating a plurality of laminated electromagnetic steel sheets, plural stator slots provided on the stator iron core, windings contained in the stator slots, a rotor iron core formed by laminating a plurality of laminated electromagnetic steel sheets and placed inside of the rotor iron core with a gap, at least one pair of slits provided on the rotor iron core to form a magnetic pole projection so as to obtain a d axis that is a direction in which the magnetic flux easily flows and a q axis that is a direction in which the magnetic flux hardly flows, a plurality of slots among which at least one pair is connected to the slits and provided at an outside so as to generate an induction torque, conductive and nonmagnetic material filled in at least the slots among the slits and the slots, and a gas vent hole provided on the d axis, it is characterized in that the gas vent hole is formed as a slender open hole, of which the longitudinal direction should be roughly parallel to the d axis, and a slit is extended to be roughly parallel to the longitudinal direction of the gas vent hole, so that it is possible to increase a salient pole difference, the magnetic saturation hardly occurs, and a rotor of a highly efficient synchronous induction motor can be obtained.

Further, in a synchronous induction motor having a stator iron core formed by laminating a plurality of laminated electromagnetic steel sheets, plural stator slots provided on the stator iron core, windings contained in the stator slots, a rotor iron core formed by laminating a plurality of laminated electromagnetic steel sheets and placed inside of the rotor iron core with a gap, at least one pair of slits provided on the rotor iron core to form a magnetic pole projection so as to obtain a d axis that is a direction in which the magnetic flux easily flows and a q axis that is a direction in which the magnetic flux hardly flows, a plurality of slots among which at least one pair is connected to the slits and provided at an outside so as to generate an induction torque, conductive and nonmagnetic material filled in at least the slots among the slits and the slots, and a gas vent hole provided on the d axis, it is characterized in that the gas vent hole is formed as a slender open hole, of which the longitudinal direction is slanted by a predetermined angle from the d axis, so that the magnetic flux easily passes, and a rotor of a highly efficient synchronous induction motor can be obtained.

Further, it is characterized in that the shaft of the rotor is cut in roughly parallel to the direction of d axis, and thus a slit adjacent to the shaft is extended so as to be parallel with the shaft, so that it is possible to increase a salient pole difference with maintaining the mechanical strength, and a rotor of a highly efficient synchronous induction motor can be obtained.

Yet further, in a synchronous induction motor having a stator iron core formed by laminating a plurality of laminated electromagnetic steel sheets, plural stator slots provided on the stator iron core, windings contained in the stator slots, a rotor iron core formed by laminating a plurality of laminated electromagnetic steel sheets and placed inside of the rotor iron core with a gap, at least one pair of slits provided on the rotor iron core to form a magnetic pole projection so as to obtain a d axis that is a direction in which the magnetic flux easily flows and a q axis that is a direction in which the magnetic flux hardly flows, a plurality of slots among which at least one pair is connected to the slits and provided at an outside so as to generate an induction torque, conductive and nonmagnetic material filled in at least the slots among the slits and the slots, and a gas vent hole provided on the d axis, it is characterized in that a rotor is formed by combining plural rotors having different shapes of slits and slots in the laminating direction of the laminated electromagnetic steel sheets, so that it is possible to obtain a rotor of a highly efficient synchronous induction motor which can be attached to an existing mechanism.

The invention claimed is:

1. A rotor of a synchronous induction motor comprising:
   a rotor iron core formed by laminating a plurality of electromagnetic steel sheets;
   at least one pair of slits provided at each of the plurality of electromagnetic steel sheets to form a magnetic pole projection so as to obtain a d axis that is a direction in which magnetic flux easily flows and a q axis that is a direction in which magnetic flux hardly flows;
   a plurality of slots connected to the slits and provided adjacent to an outer circumference of the electromagnetic steel sheets to generate an induction torque;
   conductive material filled in at least the slots among the slits and the slots; and
   a shaft which is an axis of rotation provided at a center part of the rotor iron core; and
   a gas vent hole on the d axis,
   wherein a slit next to the shaft has a shape which is projected along a circumference of the shaft and a circumference of the gas vent hole so as to maintain passability of magnetic flux in a direction of the d axis and increase unpassability of magnetic flux in a direction of the q axis.

2. The rotor of synchronous induction motor of claim 1 wherein the gas vent hole has a slender opening stretched in the direction of the d axis, and
   wherein the slit next to the shaft has a shape which is projected along the circumference of the shaft and a circumference in a longitudinal direction of the gas vent hole.

3. The rotor of synchronous induction motor of claim 2,
   wherein distances between the gas vent hole and slits next to the gas vent hole are set to $L \leq A+B$, where a width of the electromagnetic steel sheets at an outer circumferential edge on the d axis is L, a distance between a slit next to one side of the gas vent hole and the gas vent hole is A, and a distance between a slit next to other side of the gas vent hole and the gas vent hole is B.

4. The rotor of synchronous induction motor of claim 1,
   wherein the shaft has a cross section vertical to the axis of rotation, in which a length in the direction of the q axis is shorter than a length in the direction of the d axis.

5. The rotor of synchronous induction motor of claim 1,
   wherein the rotor iron core is formed by laminating grain oriented electromagnetic steel sheets as the electromagnetic steel sheets, and
   wherein the grain oriented electromagnetic steel sheets are formed so that easily magnetizable direction should be roughly parallel to the d axis.

6. A compressor comprising the rotor of synchronous induction motor of claim 1.

7. The rotor of a synchronous induction motor of claim 1, wherein a width of the electromagnetic steel sheets at an outer circumferential edge that form a magnetic path on the d axis is a predetermined width that does not generate magnetic saturation, and a nonmagnetic portion is provided so that a width of the magnetic path on the d axis, except in the proximity of the shaft, is equal to or greater than the predetermined width.

* * * * *